United States Patent
Chou et al.

(10) Patent No.: US 7,805,665 B2
(45) Date of Patent: Sep. 28, 2010

(54) PARITY ENGINE FOR USE IN STORAGE VIRTUALIZATION CONTROLLER AND METHOD OF GENERATING DATA BY PARITY ENGINE

(75) Inventors: Teh-Chern Chou, Chung-Ho (TW); Wei-Shun Huang, Chung-Ho (TW); Ching-Hao Chou, Taipei (TW)

(73) Assignee: Infortrend Technology, Inc., Taipei Hsien (TW)

(*) Notice: Subject to any disclaimer, the term of this patent is extended or adjusted under 35 U.S.C. 154(b) by 973 days.

(21) Appl. No.: 11/514,159

(22) Filed: Sep. 1, 2006

(65) Prior Publication Data
US 2007/0055905 A1 Mar. 8, 2007

Related U.S. Application Data

(60) Provisional application No. 60/596,145, filed on Sep. 2, 2005.

(51) Int. Cl.
*G06F 11/00* (2006.01)
(52) U.S. Cl. ...................................... 714/801
(58) Field of Classification Search ............ 714/4, 714/6, 752, 800, 801; 711/114, 163, 203; 710/240
See application file for complete search history.

(56) References Cited

U.S. PATENT DOCUMENTS

| 5,893,138 | A | | 4/1999 | Judd et al. |
| 5,960,169 | A | * | 9/1999 | Styczinski ................ 714/6 |
| 7,219,289 | B2 | * | 5/2007 | Dickson ................ 714/752 |
| 7,281,072 | B2 | * | 10/2007 | Liu et al. ................ 710/240 |
| 2005/0005044 | A1 | * | 1/2005 | Liu et al. ................ 710/74 |

FOREIGN PATENT DOCUMENTS

TW 417061 1/2001

* cited by examiner

*Primary Examiner*—Shelly A Chase
(74) *Attorney, Agent, or Firm*—Rosenberg, Klein & Lee

(57) ABSTRACT

A parity engine for use in a storage virtualization controller includes a control unit being a control kernel of the parity engine; a control unit buffer serving as a data buffer of the control unit and storing map tables required for operations; at least one XOR engine being started by the control unit and used to select data from a data stream according to the map tables stored in the control unit buffer for performing XOR operations; and at least one data buffer serving as the data buffer of the XOR engine in the operating process.

43 Claims, 11 Drawing Sheets

| $D_0$ | $D_1$ | $D_2$ | $P_1$ |

| $D_3$ | $D_4$ | $P_2$ | $D_5$ |

| $D_6$ | $P_3$ | $D_7$ | $D_8$ |

| $P_4$ | $D_9$ | $D_{10}$ | $D_{11}$ |

| $D_{12}$ | $D_{13}$ | $D_{14}$ | $P_5$ |

| Next-SG-List-Addr | | | | | | | R | I |
|---|---|---|---|---|---|---|---|---|
| R | ElemSizddr | R | ElemCnt | Reserved | | | | |
| R | ElemCombCnt | | | S | P | R | StreamCnt | |
| StreamLng | | | | | | | | |
| Generalized XOR Descriptor1 | | | | | | | | |
| Generalized XOR Descriptor2 | | | | | | | | |
| StreamBseAdr0 | | | | | | | | |
| StreamBseAdr1 | | | | | | | | |
| StreamBseAdr2 | | | | | | | | |
| ⋮ | | | | | | | | |
| StreamBseAdrn-1 | | | | | | | | |

Field Definitions:
"I" – Generate interrupt when transfer complete.
"R" – Reserved (CPU should set these to "0" for future compatibility).
"S" – Flag indicating whether or not a simple XOR is to be computed.
"P" – Flag indicating whether preload previous results from GenXORDstAdrs is needed.
"ElemSiz" – Basic XOR element size as a power of 2.
"ElemCnt" – Basic XOR element count before repeating.
"ElemCombCnt" – Number of XOR combinations to perform.
"StreamCnt" – Number of data streams. Maximum StreamCnt is 8.
"StreamLng" – Total length to XOR in unit of byte.
"GenXORDesc" – Generalized XOR descriptor
"StreamBseAdr0~7" – Base address for Data Stream 0~7.

FIG. 9

| R | 5 | R | R | 1 | R | Reserved | R |
|---|---|---|---|---|---|---|---|
| | | | | | | | 1 |
| 8000_0000 | | 2 | 8 | 2 | 1 | | 2 |
| | | | 512 | | | | |
| | | | A000_0000 0000_0000 | | | | |
| | | | B000_0000 1000_0000 | | | | |
| | | | Start address of $D_1$ | | | | |
| | | | Start address of $D_1'$ | | | | |

FIG. 10

PARITY ENGINE FOR USE IN STORAGE VIRTUALIZATION CONTROLLER AND METHOD OF GENERATING DATA BY PARITY ENGINE

RELATED APPLICATIONS

This application claims priority to provisional patent application Ser. No. 60/596,145, filed Sep. 2, 2005, and entitled "PARITY ENGINE FOR USE IN STORAGE VIRTUALIZATION CONTROLLER AND METHODS OF GENERATING DATA FOR PARITY ENGINE", which is incorporated herein by reference.

BACKGROUND OF THE INVENTION

1. Field of the Invention

The present invention relates to a disk array controller, and more particularly to a method of generating data by a parity engine in a disk array controller by using map tables.

2. Description of Related Art

As the present information technology advances, data storing and data security become increasingly important, and thus many storage medium related technologies are developed. For example, the input/output (I/O) efficiency of a disk is improved to cope with the increasing demand for a higher performance of a computer system. Another example is that, in addition to the requirement for a larger storage capacity, higher security and reliability are also taken into consideration, and the data access service can be continuously provided even when there is a problem occurred in the hard disk drive.

With the foregoing considerations, the concept of a redundant array of inexpensive/independent disks (RAID) is introduced. The purpose of the RAID resides in storing data into several different disks to improve the storing efficiency and mutually backuping data on multiple disk drives to enhance the reliability of stored data. The advantages of the RAID include providing a better data storage efficiency and a higher data fault tolerance capability. By evenly distributing the workload among several physical disks, a better performance can be achieved. By means of multiple data operations, a high fault tolerance capability can be achieved by rebuilding data through the aid of other disk drives if one or more disk drives or sectors fail.

A disk array is shown as a single logical disk in an operating system. A RAID controller can control how the data is stored and accessed between a physical disk array and a logical disk array, in which several disk drives are integrated into a single virtual disk drive with a large capacity through the RAID controller. The implementation of various different types of the RAID is introduced as follows.

A RAID level 0 (RAID-0) is a faster disk array, in which data is written linearly or through different disk drives to achieve faster data transmission. This technology divides data and stores them into different disk drives for providing the best performance, but having no fault tolerance capability. The RAID level 0 accesses data over several different disk drives. If any one of the disk drives fails, the whole record of data will be damaged or destroyed. Referring to FIG. 1 for the schematic view of the prior art, a complete set of data 10 is divided and computed by the algorithm of the RAID level 0. For example, the data 10 is divided into segments 1, 2, 3, 4, 5, 6 separately, in which the data 1, 3, 5 are stored in a first disk 11 and the data 2, 4, 6 are stored in a second disk 12. The two disk drives 11, 12 jointly access a set of data, and thus the data access rate can be almost doubled.

A RAID level 1 (RAID-1) uses at least two disk drives such as a first disk 11 and a second disk 12 as shown in FIG. 2, and the both disks 11, 12 store the same data block. In other words, two identical sets of data are created in two different disk drives while storing the data 10, and thus the first disk 11 and the second disk 12 simultaneously contain the data 10. If there are data damaged or destroyed in a disk, another one can take over immediately, so that the RAID level 1 has a high reliability and a high fault tolerance capability. However, because it is necessary to duplicate one data set into two disk drives, the performance will be lowered and the cost will be increased.

A RAID level 0+1 (RAID-0+1) integrates the advantages of a high data access rate of the RAID level 0 and a high reliability of the RAID level 1. As shown in FIG. 3, the data 10 is divided into segments 1, 3, 5 and 2, 4, 6 stored in the first disk 11 and the second disk 12, respectively, and then they are also mapped into another disk drive group 11, 12 to achieve the effect of a high fault tolerance. The data is divided and stored into many disk drives, and each disk drive accompanies another disk drive having the same data, and thus benefiting a fast data access and a high fault tolerance.

With the progress to a RAID level 5 (RAID-5), which provides a better efficiency and a higher fault tolerance capability to a disk array, a set of parity data (which is generally called P value or an XOR parity) is stored in addition to the user data according to its design. The parity data is a calculation result by performing XOR operations to all corresponding user data, and its operational formula is given as follows:

$$P = D_0 + D_1 + D_2 + \ldots + D_{n-1} \quad (1)$$

Where, "+" stands for the XOR operation, P for the parity data, and $D_0, D_2, \ldots, D_{n-1}$ for the user data, and n stands for the number of user data disks.

In FIG. 4, four disk drives A, B, C, D are used to form a disk array of RAID level 5. Wherein there are a plurality of strips including a first strip $D_0$ stored in a disk drive A, a second strip $D_1$ stored in a disk drive B, a third strip $D_2$ stored in a disk drive C, a first parity $P_1$ corresponding to strips $D_0, D_1, D_2$ and stored in a disk drive D, and other strips $D_3, D_4, D_5$ stored respectively in the disk drives A, B, D while their corresponding second parity $P_2$ is stored in the disk drive C. In this way, the data is divided and arranged sequentially in each disk drive. Because the RAID level 5 only stores one parity, only one of the user data disks is allowed to have errors at the same time. The user data in the user data disk having errors can be recovered by using the corresponding P value and the other corresponding user data stored in the other normal user data disks to do the XOR operations. For example, if there are errors in $D_1$, then $D_1$ can be recovered by the following formula:

$$D_1 = D_0 + D_2 + \ldots + D_{n-1} + P \quad (1')$$

In the formula above, "+" also stands for the XOR operation.

Referring to FIG. 4 again, one example is that a disk drive C' can replace the original disk drive C if there is any damage or error happened in the disk drive C. By then, the data in the disk drive C' can be rebuilt by the disk drives A, B, D. For example, the strip $D_2$ in the disk drive C' is produced by performing XOR operations on the strip $D_0$ of the disk drive A, the strip $D_1$ of the disk drive B and the strip $P_1$ of the disk drive D. Therefore, a high fault tolerance and a high data access rate of the disk array can be achieved.

The fault tolerance capability of a hard disk drive becomes more important as the data capacity becomes larger and the reliability requirement becomes higher. A disk array of RAID level 6 (RAID-6) is an extended technology from the RAID level 5. This type of RAID systems is usually set up by using the "Reed-Solomon Codes" that relates to the technology of two or more parities. While storing data, a plurality of disk drives are used for storing multiple parities in order to deal with the situation of having a plurality of damaged or destroyed disk drives at the same time.

Taking a RAID-6 system having two sets of parities as an example, assuming that the RAID system has n number of user data disks D0 to Dn−1 and two parity disks P, Q for storing parities, where the P value is obtained by performing XOR operations on the corresponding user data stored in the user data disks according to Eq. (1) while the Q value can be computed by the following formula:

$$Q = g^0 * D_0 + g^1 * D_1 + g^2 * D_2 + \ldots + g^{n-1} * D_{n-1} \quad (2)$$

If there are two data disks $D_x$, $D_y$ damaged, through an appropriate derivation one obtains:

$$D_x = A \cdot (P + P_{xy}) + B \cdot (Q + Q_{xy}) \quad (3)$$

$$D_y = (P + P_{xy}) + D_x \quad (4)$$

Wherein, A and B are the constants only related to x and y:

$$A = g^{y-x} \cdot (g^{y-x} + 1)^{-1} \quad (5)$$

$$B = g^{-x} \cdot (g^{y-x} + 1)^{-1} \quad (6)$$

Moreover, $P_{xy}$ and $Q_{xy}$ are the P value and Q value, respectively, when $D_x$ and $D_y$ are zero, namely:

$$P_{xy} + D_x + D_y = P \quad (7)$$

$$Q_{xy} + g^x \cdot D_x + g^y \cdot D_y = Q \quad (8)$$

The algebraic operations in Eqs. (2) to (8), only the power of "y−x" is a normal subtraction operation, and the rest are Galois field algebraic operations, where "+" stands for an XOR operation and "*" for a multiplication-operation. Moreover, g is a prime number, preferably equal to 2.

The multiplication operations of the Galois Field are related to its domain of GF(2ⁿ). The related definition, features and operation rules are described in the following reference: 1. "The mathematics of RAID6" by H. Peter Anvin; and 2. "A Tutorial on Reed-Solomon Coding for Fault-Tolerance in RAID-like Systems" by James S. Plank.

Theoretically, both computing the Q value and recovering the $D_x$ value need a large quantity of Galois Field multiplication operations, especially the operations involving a constant multiplied by many different values. In hardware design, such multiplication operations are usually implemented by shifting digits or looking up a log table and an inverse log table. It consumes lots of system processing time. Thus, how to simplify and speed up the operations of the Q value in a RAID system having multiple parities becomes an important issue for the related industry.

SUMMARY OF THE INVENTION

The primary objective of the present invention is to improve the processing efficiency of a parity engine in a disk array system.

To achieve the foregoing objective of the present invention, the invention provides a method of generating data for a parity engine that comprises the steps of: activating at least one XOR engine; reading a data stream for performing an operation by the XOR engine; and selecting data in the data stream and performing an XOR operation according to a map table after the XOR engine receives the data stream, and storing the operation result.

In a preferred embodiment of the present invention, a parity engine used in a storage virtualization controller comprises: a control unit being a control kernel of the parity engine; a control unit buffer being a data buffer area of the control unit and storing a map table required for operations; at least one XOR engine activated by the control unit and used for selecting data in a data stream and performing an XOR operation according to a map table stored in the control unit buffer; and at least one data buffer serving as a data buffer area when the XOR engine is performing operations.

To make it easier for our examiner to understand the innovative features and technical content, we use a preferred embodiment together with the attached drawings for the detailed description of the invention, but it should be pointed out that the attached drawings are provided for reference and description but not for limiting the present invention.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein:

FIG. 4 is a schematic view of how the user data and parity data to be disposed in a RAID-5 system.

FIG. 9 is a preferred embodiment of the filed arrangement in the operating instruction list in the invention.

FIG. 10 is an example of FIG. 9.

DETAILED DESCRIPTION OF THE PREFERRED EMBODIMENTS

Figure 1:
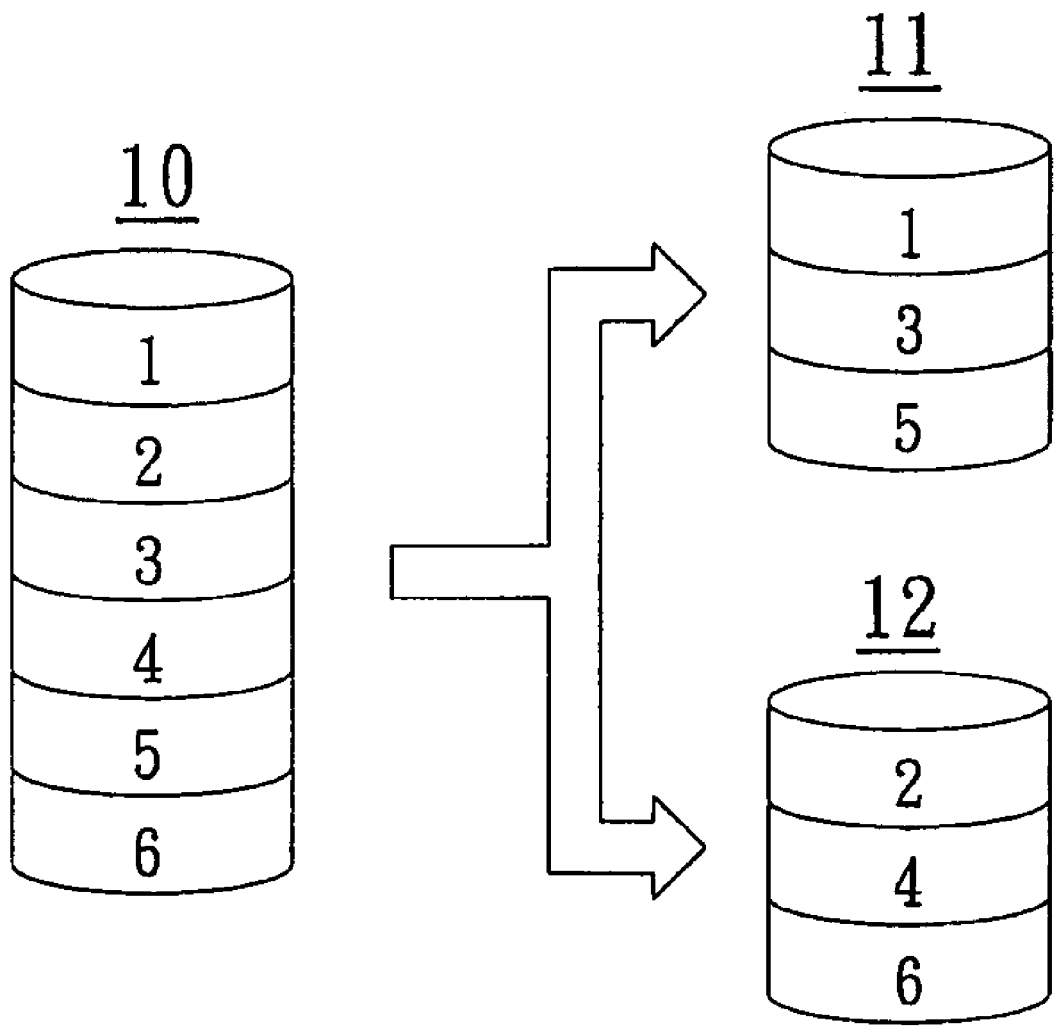
FIG. 1 is a schematic view of the storing structure of RAID level 0 in the prior art.
Figure 2:
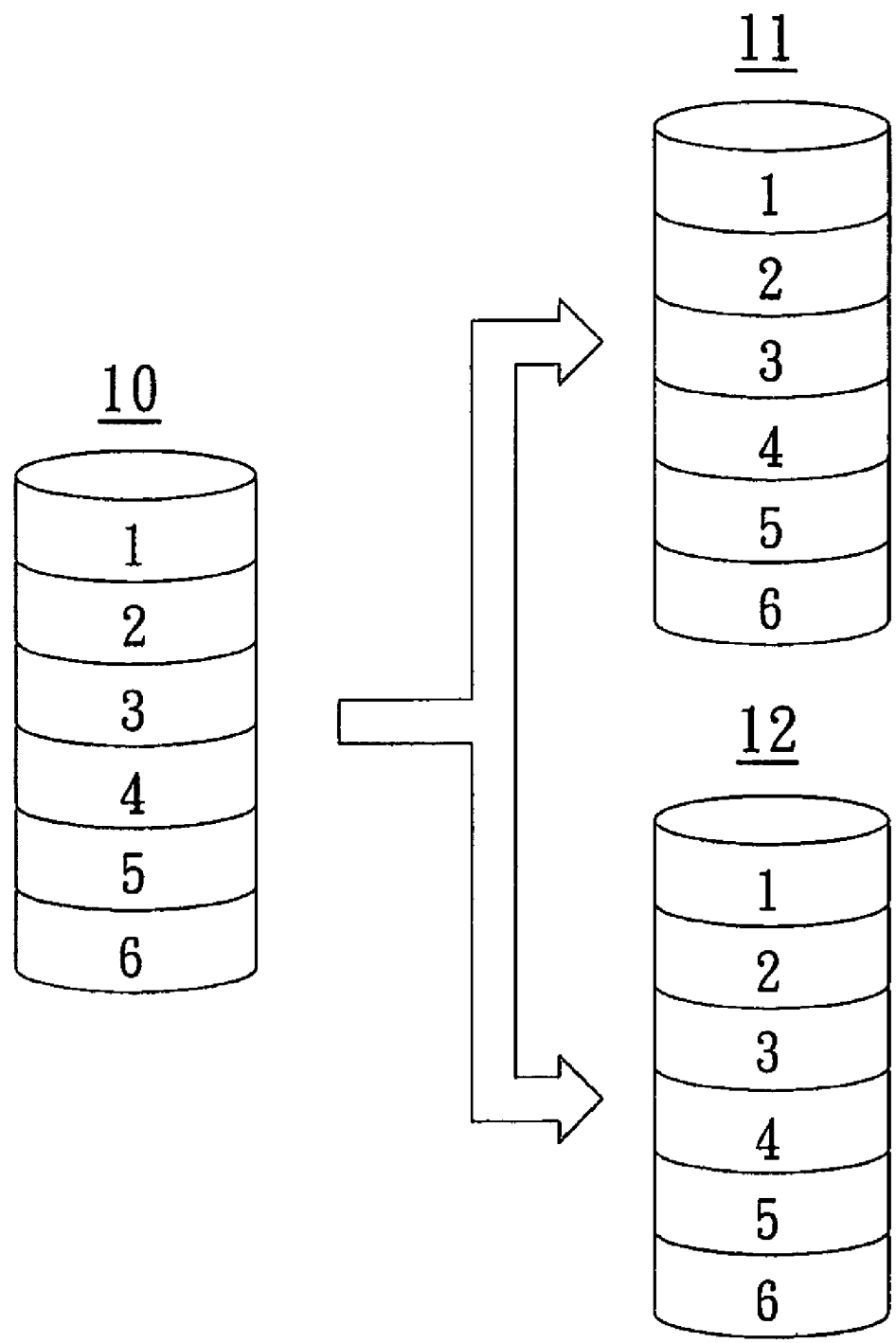
FIG. 2 is a schematic view of the storing structure of RAID level 1 in the prior art.
Figure 3:
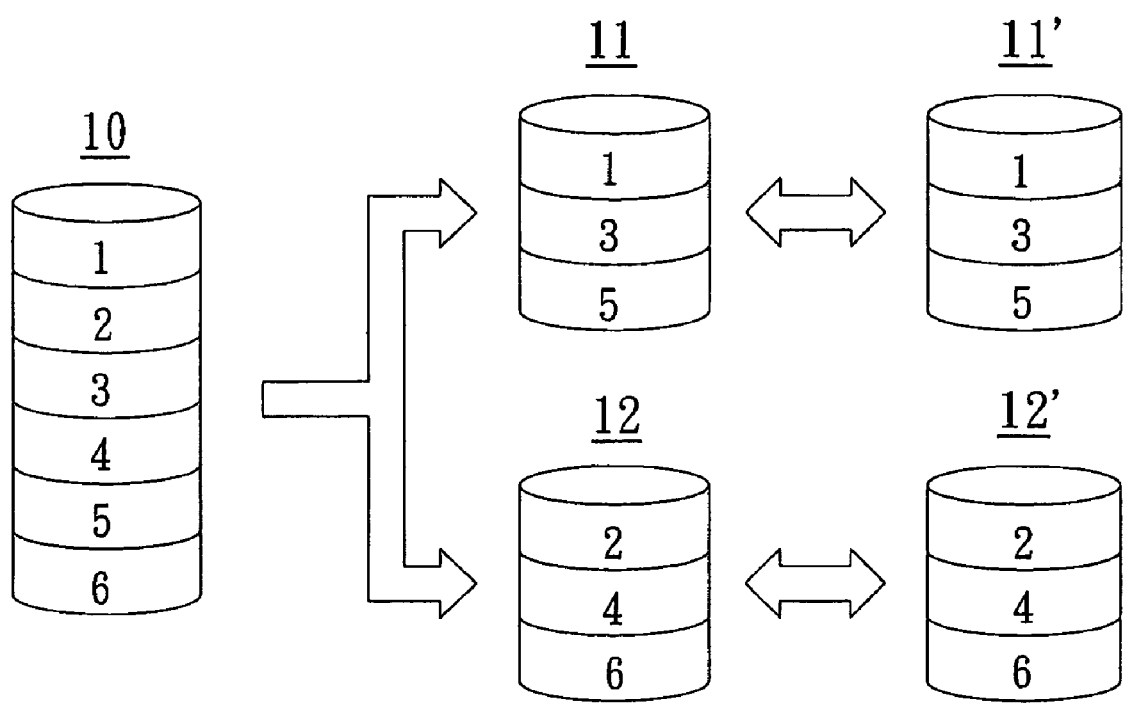
FIG. 3 is a schematic view of the storing structure of RAID level 0+1 in the prior art.

Referring to Eq. (2), applying the Reed-Solomon formula to the redundant disk arrays for the computation of the Q value is well known by those skilled in the art. However, its practical application involves complicated multiplication computations that occupy lots of system resources and result in a low system performance.

In view of the foregoing shortcomings, the invention generates map tables in advance corresponding to the multiplication parameters required by data streams in operations. The elements in the map table are either 0 or 1, so that the system hardware (the parity engine) needs only to perform XOR operations on the data picked in the data stream by following the map tables so as to omit the labor of shifting digits or looking up tables and further speed up the system operations. The way of generating the map tables generally bases on the domain of GF($2^a$) of the Galois field and the related algebraic rules, which are described as follows.

Since a=8 is a preferred choice in the practical application, most of the embodiments assume the domain of the Galois Field to be GF($2^8$), and thus the numbers covers from 0 to 255. This is because $2^8$ is exactly the amount represented by one byte which is the basic unit of the computer memory and the RAID system accordingly set up can accommodate at most 255 user data disks, which is sufficient to meet the requirements of general RAID systems. Although the detailed description of the present invention is mostly based on the hypothesis of GF($2^8$), it is not a limitation to the present invention. In other embodiments of the invention, the disclosed technology can be applied in different Galois Field domains.

Furthermore, most examples described below take a RAID 6 system having two sets of parities as the example. However, it does not imply that the invention is limited to such arrangement. Other RAID 6 systems having more than two sets of parities can be adopted in the present invention as well.

Assuming that Y, X and K are numbers in GF($2^a$). That is, Y, X and K are composed of a bits. If $y_i$ and $x_i$ stands for the $i^{th}$ bit of Y and X, respectively, then Y and X can be represented by the vectors below:

$$Y = \begin{bmatrix} y_0 \\ y_1 \\ y_2 \\ \vdots \\ y_{a-1} \end{bmatrix}, \quad X = \begin{bmatrix} x_0 \\ x_1 \\ x_2 \\ \vdots \\ x_{a-1} \end{bmatrix}$$

Let Y=K*X; that is, Y is a Galois field multiplication result of K with an arbitrary number X, where K is a given constant. The map table of K is defined as an a*a matrix M, and its elements $M_{i,j}$ ($0 \leq i,j \leq a-1$) are 0 or 1 and satisfy:

$$Y = \begin{bmatrix} y_0 \\ y_1 \\ y_2 \\ \vdots \\ y_{a-1} \end{bmatrix} = \quad (9)$$

$$M*X = \begin{bmatrix} m_{0,0} & m_{0,1} & m_{0,2} & \cdots & m_{0,a-1} \\ m_{1,0} & m_{1,1} & m_{1,2} & \cdots & m_{1,a-1} \\ m_{2,0} & m_{2,1} & m_{2,2} & \cdots & m_{2,a-1} \\ \vdots & \vdots & \vdots & & \vdots \\ m_{a-1,0} & m_{a-1,1} & m_{a-1,2} & \cdots & m_{a-1,a-1} \end{bmatrix} \cdot \begin{bmatrix} x_0 \\ x_1 \\ x_2 \\ \vdots \\ x_{a-1} \end{bmatrix}$$

That is, $y_i = \sum_{j=0}^{a-1} (m_{i,j} \cdot x_j), 0 \leq i \leq a-1$ \quad (10)

wherein $m_{i,j} \, x_j = x_j$, if $m_{i,j} = 1$ $m_{i,j} \, x_j = 0$, if $m_{i,j} = 0$.

The addition in the foregoing operations is defined as an XOR operation. From another point of view, the computation based on the map table (Matrix M) can be regarded as: XOR operations on the operation units of the user data whose corresponding elements in the matrix M are equal to 1.

The way of generating the map table is greatly related to the algebraic rules of the Galois Field. The following example takes GF($2^8$) as one example for the Galois field multiplication operation, but it is not a limitation to the present invention. If the product of an arbitrary number X and 2 is X", then X" can be obtained from the following formula (+ stands for an XOR operation):

$$X' = \begin{bmatrix} x'_0 \\ x'_1 \\ x'_2 \\ x'_3 \\ x'_4 \\ x'_5 \\ x'_6 \\ x'_7 \end{bmatrix} = \begin{bmatrix} x_7 \\ x_0 \\ x_1 + x_7 \\ x_2 + x_7 \\ x_3 + x_7 \\ x_4 \\ x_5 \\ x_6 \end{bmatrix}$$

From the above formula, the algorithm A for generating M from the map table M can be derived as follows: assuming that the map table of K is the given matrix M and the map table of K'=2*K is M', then algorithm A can be represented as Table 1:

TABLE 1

| | |
|---|---|
| m'$_{0,j}$ = m$_{7,j}$ | , 0 <= j <= 7 |
| m'$_{1,j}$ = m$_{0,j}$ | , 0 <= j <= 7 |
| m'$_{2,j}$ = m$_{1,j}$ + m$_{7,j}$ | , 0 <= j <= 7 |
| m'$_{3,j}$ = m$_{2,j}$ + m$_{7,j}$ | , 0 <= j <= 7 |
| m'$_{4,j}$ = m$_{3,j}$ + m$_{7,j}$ | , 0 <= j <= 7 |
| m'$_{5,j}$ = m$_{4,j}$ | , 0 <= j <= 7 |
| m'$_{6,j}$ = m$_{5,j}$ | , 0 <= j <= 7 |
| m'$_{7,j}$ = m$_{6,j}$ | , 0 <= j <= 7 |

One of the algebraic characteristics of the Galois Field is as follows. Starting from K=1 and multiplying K each time by 2, the derived new value of K will not repeat until covering all numbers in the domain of the Galois Field. Taking GF($2^8$) as an example, starting from K=1 and recording it, the value of K is multiplied by 2 each time, and after 255 times recording, the values of K will cover all numbers in GF($2^8$) (except for 0).

All map tables can be generated according to the aforementioned algebraic characteristics of the Galois Field and the algorithm A.

Several map tables in GF($2^8$) are listed below for reference:

$K = 0$ \qquad\qquad $K = 2^0 = 1$ $$\begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

-continued $$K = 2^{27} = 12 \quad\quad K = 2^{55} = 160$$

$$\begin{bmatrix} 1 & 1 & 1 & 0 & 0 & 0 & 1 & 0 \\ 0 & 1 & 1 & 1 & 0 & 0 & 0 & 1 \\ 1 & 1 & 0 & 1 & 1 & 0 & 1 & 0 \\ 1 & 0 & 0 & 0 & 1 & 1 & 1 & 1 \\ 0 & 0 & 1 & 0 & 0 & 1 & 0 & 1 \\ 0 & 0 & 0 & 1 & 0 & 0 & 1 & 0 \\ 1 & 0 & 0 & 0 & 1 & 0 & 0 & 1 \\ 1 & 1 & 0 & 0 & 0 & 1 & 0 & 0 \end{bmatrix} \quad \begin{bmatrix} 0 & 0 & 1 & 0 & 1 & 0 & 1 & 1 \\ 0 & 0 & 0 & 1 & 0 & 1 & 0 & 1 \\ 0 & 0 & 1 & 0 & 0 & 0 & 0 & 1 \\ 0 & 0 & 1 & 1 & 1 & 0 & 1 & 1 \\ 1 & 0 & 1 & 1 & 0 & 1 & 1 & 0 \\ 0 & 1 & 0 & 1 & 1 & 0 & 1 & 1 \\ 1 & 0 & 1 & 0 & 1 & 1 & 0 & 1 \\ 0 & 1 & 0 & 1 & 0 & 1 & 1 & 0 \end{bmatrix}$$

When the map tables are generated, the corresponding XOR operations are performed on the data according to the map tables in practical operations.

Furthermore, the XOR operation unit can be enlarged appropriately to w bits in order to speed up the system operations of the disk array (RAID). Please review the definition of a map table. That is, in Eq. (9), $y_i$ and $x_i$ stand for the $i^{th}$ bit of Y and X, respectively, and Y and X are the numbers in $GF(2^a)$. In other words, the operation unit of the XOR operations is one bit in conventional operations. The disclosed technology of the present invention enlarges the unit of the XOR operation to w bits, and the unit of the operand is accordingly enlarged to w*a bits. Taking $GF(2^8)$ as an example, if setting w=32 in the present invention, the unit of the XOR operation is 32 bits and the unit of the operand is 32*8=256 bits=32 bytes, which is a set of 32 values in $GF(2^8)$.

Figure 5:
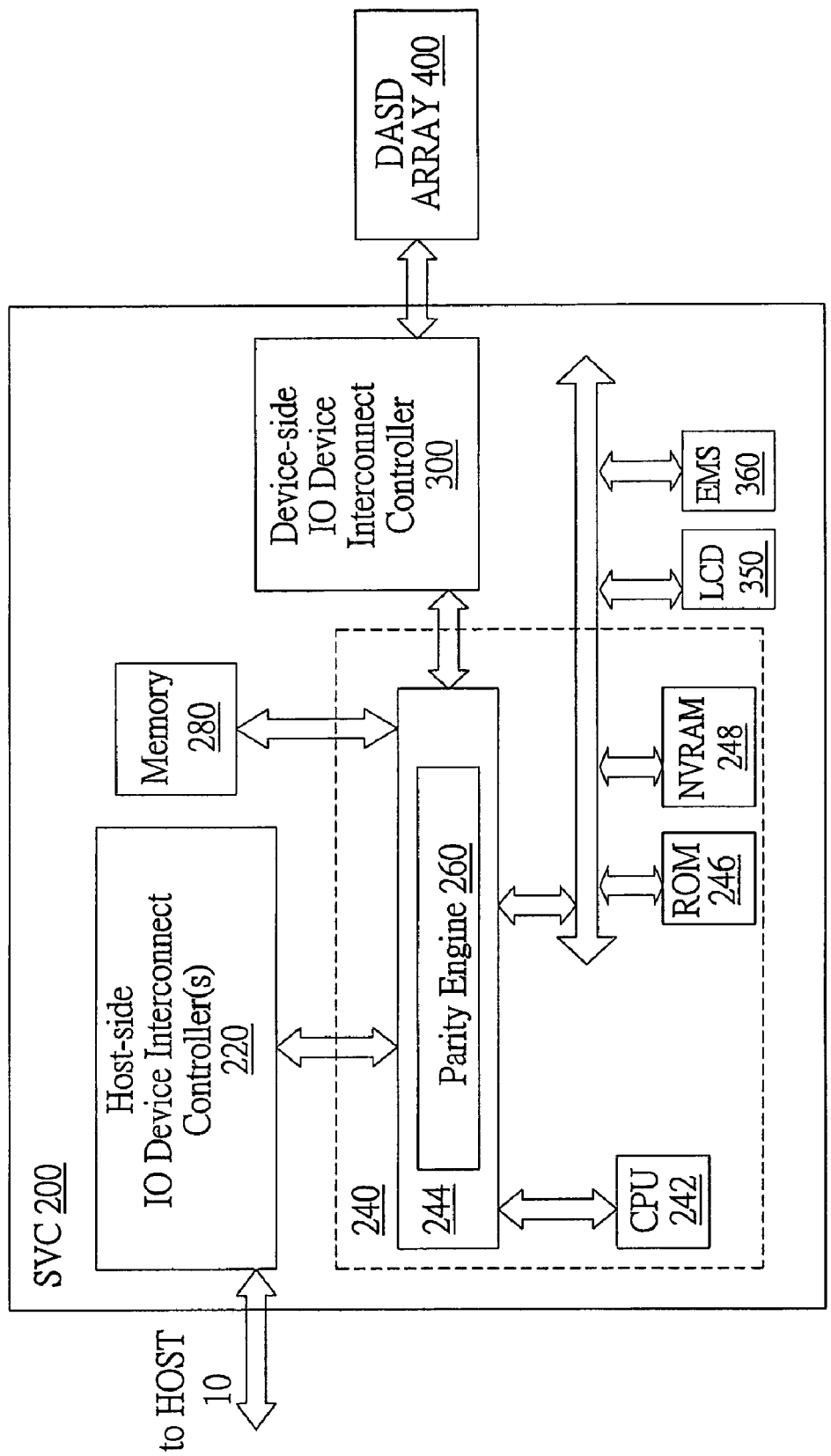
FIG. 5 is a schematic view of an embodiment of a disk subsystem employing the invention.

Referring to FIG. 5, it is a schematic view of a storage system according to a preferred embodiment of the present invention. A disk array 400 composed of a plurality of disk drives is considered as a single logical disk drive when a computer host 10 accesses the disk array 400. The primary objective of the storage virtualization controller (SVC) 200 is to map the combination of all sectors in the disk drives to form the logical disk drive visible to the host system. The I/O request received by the controller 200 from the host 10 will be parsed and interpreted first after it is received by the controller 200 from the host system, and the related operations and data will be compiled into I/O requests of the disk drives.

In this preferred embodiment, the storage virtualization controller 200 includes a host-side I/O device interconnect controller 220, a central processing circuit (CPC) 240, a memory 280 and a device-side I/O device interconnect controller 300. Although these components are described using separated functional blocks, some or even all of the functional blocks can be integrated on a single chip in practical applications.

The host-side I/O device interconnect controller 220 is connected to the host 10 and the central processing circuit 240 to be an interface and a buffer between the storage virtualization controller 200 and the host 10. The host-side I/O device interconnect controller 220 can receive I/O requests and the related data from the host 10 and convert or map them to the central processing circuit 240.

The memory 280 is connected to the central processing circuit 240 to be a buffer for buffering the data transmitted between the host 10 and the disk array 400 passing through the central processing circuit 240.

The device-side I/O device interconnect controller 300 is disposed between the central processing circuit 240 and the disk array 400 to be an interface and a buffer between the storage virtualization controller 200 and the disk array 400. The device-side I/O device interconnect controller 300 receives I/O requests and the related data from the central processing circuit 240 and maps and/or transmits them to the disk array 400.

The central processing circuit 240 comprises a CPU chipset 244 (including a parity engine 260 inside), a central processing unit 242 (CPU), a read only memory (ROM) 246 and a nonvolatile random access memory (NVRAM) 248. The CPU 242 can be, for example, a Power PC CPU; the ROM 246 can be a flash memory for storing a basic input/output system (BIOS) and/or other programs. The CPU 242 is coupled to other electronic components (such as the memory 280) through the CPU chipset 244. The NVRAM 248 is used to store information related to the status of the I/O operations on the physical storage device array so that the information can be used as a check when the power is shut down abnormally before the I/O operations are completed. The ROM 246, NVRAM 248, LCD module 350 and enclosure management service (EMS) circuit 360 are coupled to a CPU chipset 244 via a low speed bus (e.g. an ISA-bus). Besides, the NVRAM 248 is optional and it can be omitted in another embodiment of the present invention. Although the CPU chipset 244 is described as a functional block integrated with the parity engine 260, the CPU chipset 244 and the parity engine 260 can be disposed on different chips in practical applications.

Figure 6:
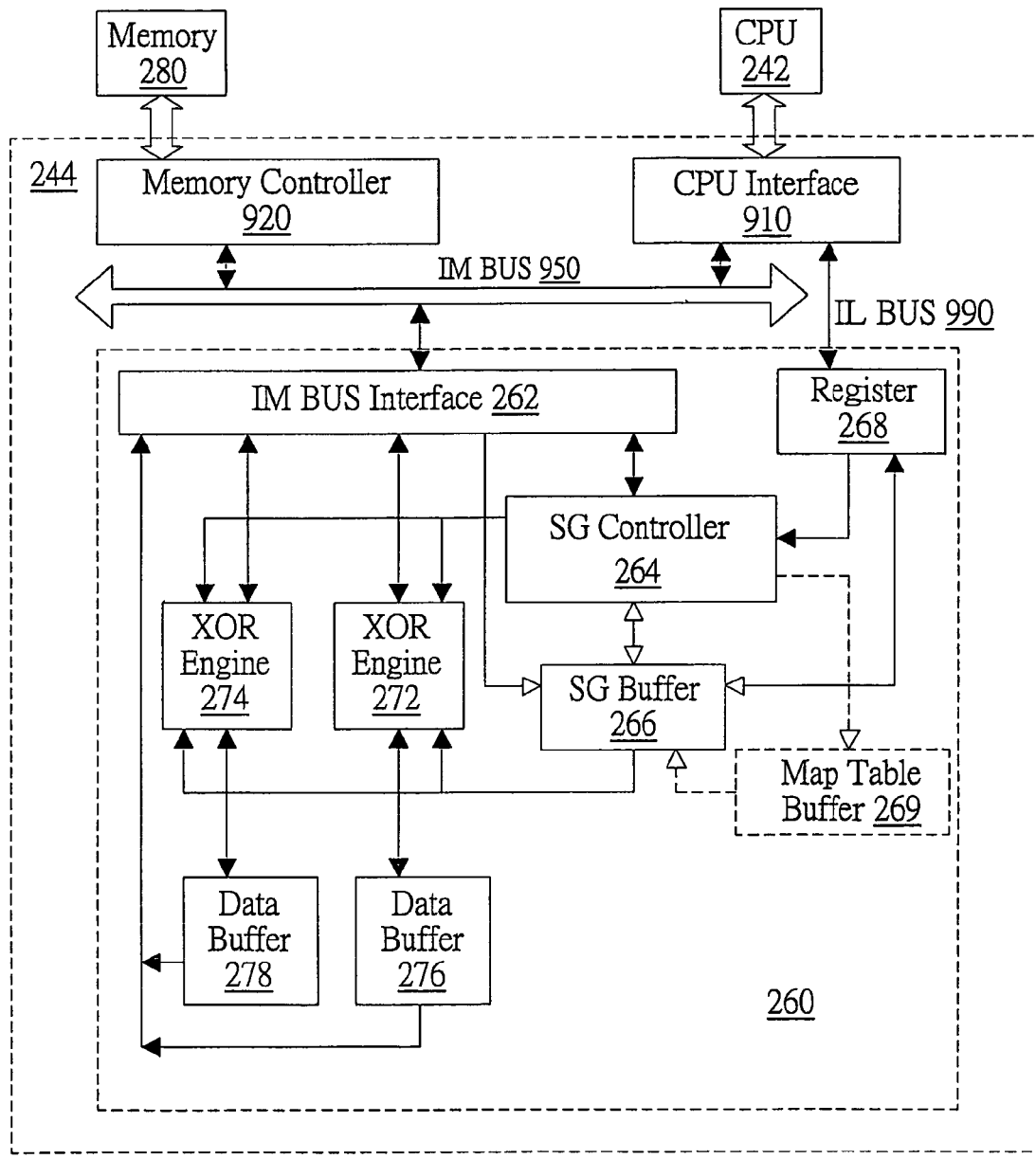
FIG. 6 is a schematic view of an embodiment of the parity engine situated in the CPU chipset.

Referring to FIG. 6, it shows an embodiment of the parity engine 260 disposed in the CPU chipset. The CPU 242 communicates with other components through the CPU interface 910, and the memory 280 communicates with other components through the memory controller 920. The communication channel between the CPU interface 910 and the CPU 242 can be, for example, a 64-bit data transmission line and a 32-bit address line. The IM (Internal Main) bus 950 connects the parity engine 260, the CPU interface 910, and the memory controller 920 for transmitting data signals and control signals among them. The IL (Internal Local) bus 990 connects the CPU interface 910 and other low-speed devices (such as a register 268).

The parity engine 260 responds to the instruction of the CPU 242 to execute a parity function of a specific RAID level. Of course, in certain specific conditions, e.g., the RAID-0, the parity engine 260 can be disabled for not performing the parity function. In the embodiment, assuming that there are two parities (P, Q) adopted in the system for following description. The parity engine 260 comprises a register 268, an IM (Internal Main) bus interface 262, a control unit (SG controller) 264, a control unit buffer (SG buffer) 266, two XOR engines 272, 274 and two data buffers 276, 278. The purpose of disposing two XOR engines 272, 274 in the embodiment resides in that when the CPU 242 needs to activate the parity engine 260 to generate two parities (P, Q) or rebuild two disk data sets (e.g., for updating disk data or recovering two damaged disk drives), two XOR engines can work simultaneously to separately generate two needed data sets so as to improve the operation efficiency. Of course, when there is only one set of data needed to be generated, the CPU 242 will just activate one of the parity engines to generate data. In a preferred embodiment, the number of XOR engines should be equal to the number of parities adopted in the RAID system. For example, for the RAID system adopting three parities to deal with the situation that three disk drives damaged simultaneously, the number of disposed XOR engines should be three. However, it is also a feasible implementation that a plurality of data sets (e.g. P and Q values) is computed in sequence by only one XOR engine.

The IM bus interface 262 is the interface between the parity engine 260 and the IM (Internal Main) bus 950 and coupled to the control unit (SG controller) 264, the control unit buffer (SG buffer) 266, the first and second XOR engines 272, 274 and the two data buffers 276, 278. The CPU 242 fills data in the register 268 to activate the register 268. In this embodiment, the register 268 is disposed in the block of the parity engine 260. However, in other embodiment, the register 268 may be situated in other blocks. For example, the register 268 is disposed in a register array which integrates all registers required for all functional blocks in the CPU chipset. The control unit (SG controller) 264 is triggered and activated by the register 268, and the control unit (SG controller) 264 is a control kernel of the parity engine 260. The control unit buffer (SG buffer) 266 operates together with the control unit (SG controller) 264 and is connected with the two XOR engines 272, 274. The control unit buffer (SG buffer) 266 serves as a data buffer of the control unit (SG controller) 264 and stores map tables required for operations. The two XOR engines 272, 274 are activated by the control unit (SG controller) 264 for selecting data from the data streams and performing XOR operations according to the map tables stored in the control unit buffer (SG buffer) 266. The data buffers 276, 278 are corresponding to the two XOR engines 272, 274, respectively, and serve as data buffers of the two XOR engines 272, 274 in the operation process.

As described above, the present invention primarily replaces the multiplication parameters required for the data stream with the corresponding map tables (the elements of each are 0 or 1), and thus the system hardware (parity engine) just needs to select data from the data stream according to the map tables and perform XOR operations.

For example, suppose the system starts calculating the value of Q. According to Eq. (2) and setting g=2, $Q=2^0*D_0+2^1*D_1+\ldots+2^r*D_r+\ldots+2^{n-1}*D_{n-1}$, wherein $D_0$ to $D_{n-1}$ represent the data serials of user data disks, r=0 to n−1, respectively. Starting from r=0, reading a user data $D_r$ of the $r^{th}$ data disk, dividing the $D_r$ into $(x_0 \sim x_{a-1})_r$ according to the operation unit of w bits set by the system, and finding the map table corresponding to $2^r$ (matrix $M_r$, $0 \leq r \leq n-1$), wherein $x_i$ ($0 \leq i \leq a-1$) has a data length of w bits, and a is the value used in $GF(2^a)$. If $$Q = 2^0 * D_0 + 2^1 * D_1 + \ldots + 2^r * D_r + \ldots + 2^{n-1} * D_{n-1}$$
$$= Y_0 + Y_1 + \ldots + Y_r + \ldots + Y_{n-1}$$

The concept of loops is used here for the computation of the foregoing formula. Starting from r=0, each loop can use a map table corresponding to each multiplication parameter to select data $(x_0 \sim x_{a-1})_r$ in each $D_r$ to perform XOR operations and accordingly generate the corresponding $Y_r$ $(Y_0 \sim y_{a-1})_r$, and then perform XOR operations on $Y_r$ (r=0~n−1) to produce the value of Q.

Or, starting from r=0, an initial data B is loaded to join the XOR operation when each loop uses a map table corresponding to each multiplication parameter to select data $(x_0 \sim x_{a-1})_r$ of each $D_r$ to perform XOR operations, namely, the result of the XOR operation in each loop is $B+2^r*D_r$. In principle, if r=0, the initial value is equal to 0. Except for r=0, the initial value of each loop is the computed result of the last loop. In other words, the computed result of each loop r is equal to $2^0*D_0+2^1*D_1+\ldots+2^r*D_r=Y_0+Y_1+\ldots+Y_r$. Thus, the XOR operation result of the $r=n-1^{th}$ loop is equal to the value of Q.

The embodiment implemented according to the concept of the second kind of loops described above is that an initial data B is loaded when each data stream is computed based on its map table, and basically the initial data other than the one of the first data stream is the computed result of the last loop. Referring to FIG. 6, the loop computation method adopted by the XOR engines 272, 274 according to the embodiment basically is that the storage spaces for storing computed results in data buffers 276, 278 are cleared to zero before performing operations on each of the data streams, and the computed result will be stored in the storage spaces of the data buffers when the operations of the data stream are completed. Moreover, the data in the storage space is loaded into the data buffer as an initial data before performing operations on each of the data streams.

As shown in Eq. (9) above:

$$Y = \begin{bmatrix} y_0 \\ y_1 \\ y_2 \\ \vdots \\ y_{a-1} \end{bmatrix} =$$

$$M*X = \begin{bmatrix} m_{0,0} & m_{0,1} & m_{0,2} & \ldots & m_{0,a-1} \\ m_{1,0} & m_{1,1} & m_{1,2} & \ldots & m_{1,a-1} \\ m_{2,0} & m_{2,1} & m_{2,2} & \ldots & m_{2,a-1} \\ \vdots & \vdots & \vdots & & \vdots \\ m_{a-1,0} & m_{a-1,1} & m_{a-1,2} & \ldots & m_{a-1,a-1} \end{bmatrix} \cdot \begin{bmatrix} x_0 \\ x_1 \\ x_2 \\ \vdots \\ x_{a-1} \end{bmatrix}$$

If the initial value of each loop is represented with B ($b_0 \sim b_{a-1}$) and the computed result of each loop is represented with Z ($z_0 \sim z_{a-1}$), then the computation of each loop can be represented as follows:

$$Z = \begin{bmatrix} z_0 \\ z_1 \\ z_2 \\ \vdots \\ z_{a-1} \end{bmatrix} = B+Y = \begin{bmatrix} b_0 \\ b_1 \\ b_2 \\ \vdots \\ b_{a-1} \end{bmatrix} + \begin{bmatrix} y_0 \\ y_1 \\ y_2 \\ \vdots \\ y_{a-1} \end{bmatrix} \quad (11)$$

$$= \begin{bmatrix} b_0 \\ b_1 \\ b_2 \\ \vdots \\ b_{a-1} \end{bmatrix} + \begin{bmatrix} m_{0,0} & m_{0,1} & m_{0,2} & \ldots & m_{0,a-1} \\ m_{1,0} & m_{1,1} & m_{1,2} & \ldots & m_{1,a-1} \\ m_{2,0} & m_{2,1} & m_{2,2} & \ldots & m_{2,a-1} \\ \vdots & \vdots & \vdots & & \vdots \\ m_{a-1,0} & m_{a-1,1} & m_{a-1,2} & \ldots & m_{a-1,a-1} \end{bmatrix} \cdot \begin{bmatrix} x_0 \\ x_1 \\ x_2 \\ \vdots \\ x_{a-1} \end{bmatrix}$$

Figure 7:
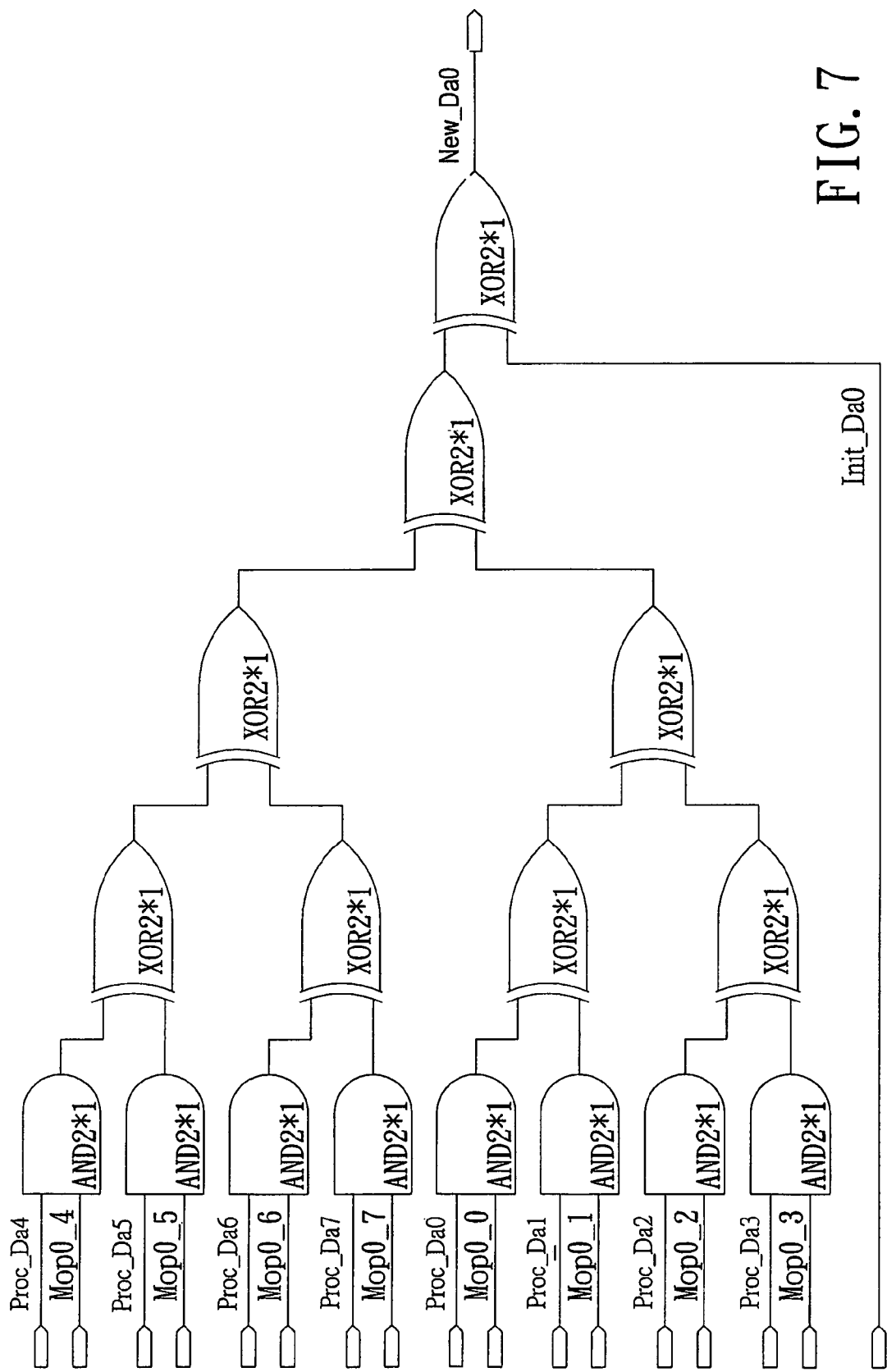
FIG. 7 is a schematic view of an embodiment of the XOR engine shown in FIG. 6

Referring to FIG. 7 which is an embodiment of the XOR engine shown in FIG. 6. FIG. 7 depicts the basic circuit unit that only generates a 1-bit operation result. It is noteworthy that the embodiment is just used for illustrating an example of the XOR engine, and it is not intended to limit the scope of the invention, and thus it is intended to cover various modifications and similar arrangements included and within the spirit and scope of appended claims. As mentioned above, the present invention can enlarge the operation unit to w bits, so the subunit for computing the data in each operation unit in the embodiment should have w basic circuit units.

The followings description takes w=1 and a=8 as an example. Namely, there is only a basic circuit unit in the subunit. The basic circuit unit has 8 AND gates and 8 XOR gates. Since w=1, the data $x_i$ (i=0~a−1, a=8) is a one-bit data.

An input pin (Proc_Da0~Proc_Da7) of each AND gate is corresponding to each bit of the loaded data ($x_0 \sim x_7$), respectively, and another input pin (Map0_0~Map0_7) is corresponding to the value of the $i^{th}$ row ($m_{i,0} \sim m_{i,7}$) of the loaded map table, respectively. The function of the AND gates is to select data ($x_0$~$x_7$) according to the value of the $i^{th}$ row ($m_{i,0}$~$m_{i,7}$) of the map table. When $m_{i,j}$=1 (j=0~7), the output of the AND gate is equal to the data corresponding to the AND gate. Except the XOR gate at the utmost right side, the other 7 XOR gates chiefly perform XOR operations to the outputs of the 8 AND gates, and the operation result is yi, which then becomes an input of the XOR gate at the utmost right side. The input pin (Init_Da0) of the XOR gate at the utmost right side corresponds to an initial data $b_i$ loaded from the data buffer, and thus the output value of the XOR gate is the operation result $z_i$ of the $i^{th}$ row of the map table corresponding to this loop.

Next example assumes w=2 and a=8 for the following illustration. It also implies that the data $a_0$~$a_{15}$ of 2*8=16 bits can be processed at a time, and two bits are grouped to be one operation unit represented as ($x_0$~$x_7$), where ($a_1$,$a_{10}$) corresponds to $x_0$, ($a_3$,$a_2$) corresponds to $x_1$, and so on. The value of each $z_i$ (i=0~7) of the operation result Z of each loop and the value of each $b_i$ (i=0~7) of the initial value B of each loop are two-bit values.

In this embodiment, the subunit has two basic circuit units. In one of the basic circuit units, an input pin (Proc_Da0~Proc_Da7) of each AND gate respectively corresponds to the first bit ($a_0$, $a_2$, $a_4$, $a_6$, $a_8$, $a_{10}$, $a_{12}$, $a_{14}$) of the data $x_i$ (i=0~7), and the input pin (Init_Da0) of the XOR gate at the utmost right side corresponds to the first bit of the initial data $b_i$ of the $i^{th}$ row. In the other one of the basic circuit units, an input pin (Proc_Da0~Proc_Da7) of each AND gate respectively corresponds to the second bit ($a_1$, $a_3$, $a_5$, $a_7$, $a_9$, $a_{11}$, $a_{13}$, $a_{15}$) of the data $x_i$ (i=0~7), and the input pin (Init_Da0) of the XOR gate at the utmost right side corresponds to the second bit of the initial data $b_i$ of the $i^{th}$ row. However, the input pins (Map0_0~Map0_7) of the AND gates in both the basic circuit units respectively correspond to the values ($m_{i,0}$~$m_{i,7}$) of the $i^{th}$ row of the loaded map table. Therefore, the output value of the XOR gate at the utmost right side of this subunit constitutes the 2-bit operation result $z_i$ of the $i^{th}$ row of the map table corresponding to this loop.

Taking advantage of the embodiment described above, the persons skilled in the art can enlarge w to any value based on the spirit of the invention. For example, w=8 indicates that each data $x_i$ (i=0~a−1) in the data ($x_0$~$x_a$) is an 8-bit data, and each $z_i$ (i=0~a−1) in the operation result Z of each loop and each $b_i$ (i=0~a−1) in the initial value B of each loop are 8-bit values as well. In this case, the subunit should have eight basic circuit units. An input pin (Proc_Da0~Proc_Da7) of each AND gate of the first basic circuit unit corresponds to the first bit of the data $x_i$ (i=0~a−1), and an input pin (Init_Da0) of the XOR gate at the utmost right side corresponds to the first bit of the initial data $b_i$ of the $i^{th}$ row. An input pin (Proc_Da0~Proc_Da7) of each AND gate of the second basic circuit unit corresponds to the second bit of the data $x_i$ (i=0~a−1), and an input pin (Init_Da0) of the XOR gate at the utmost right side corresponds to the second bit of the initial data $b_i$ of the $i^{th}$ row. And so on until the eight basic circuit unit in which an input pin (Proc_Da0~Proc_Da7) of each AND gate corresponds to the eighth bit of the data $x_i$ (i=0~a−1) and an input pin (Init_Da0) of the XOR gate at the utmost right side corresponds to the eighth bit of the initial data $b_i$ of the $i^{th}$ row. The input pins (Map0_0~Map0_7) of the AND gate of the eight basic circuit units respectively correspond to the values ($m_{i,0}$~$m_{i,7}$) of the $i^{th}$ row of the loaded map table. Thus, the output value of the XOR gate at the utmost right side of the subunit constitutes the 8-bit operation result $z_i$ of the $i^{th}$ row of the map table corresponding to this loop.

Moreover, in one embodiment, each XOR engine only disposes a subunit and uses this subunit to calculate the operation result $z_i$ with i=0~a−1 one by one for each row so as to obtain the operation result Z. However, it is understandable that its efficiency is unsatisfactory to users.

Therefore, in a preferred embodiment, the number of the subunits can be determined according to the number of rows of the corresponding map table. Generally, the number of rows of the map table should be equal to the a value in GF($2^a$), so as to obtain a result of w*a bits at a time. For example, a=8 means that the XOR engine has 8 subunits. Wherein, the input pins (Map0_0~Map0_7) of the AND gates of each subunit respectively correspond to the value ($m_{i,0}$~$m_{i,a-1}$) (i=0~a−1) of one of the a rows in the map table. For example, the first subunit corresponds to the value ($m_{0,0}$~$m_{0,a-1}$) of the first row; the second subunit corresponds to the value ($m_{1,0}$~$m_{1,a-1}$) of the second row; and so on until the $a^{th}$ subunit corresponds the value ($m_{a-1,0}$~$m_{a-1,a-1}$) of the $a^{th}$ row. Therefore, the output value of the XOR gate at the utmost right side of the a number of subunits constitutes the operation result Z of w*a bits of this loop.

In addition to the foregoing methods, the persons skilled in the art may make various modifications based on the spirit of the invention. For example, only a/2 subunits are disposed. That is, the operation result Z is obtained by operating a data stream X twice. In the first operation, each subunit corresponds to the $i^{th}$ row with i=0~(a/2)−1 and uses the value ($m_{i,0}$~$m_{i,a-1}$) thereof in the map table to obtain $z_0$~$z_{a/2-1}$. In the second operation, each subunit corresponds to the $i^{th}$ row with i=a/2~a−1 and uses the value ($m_{i,0}$~$m_{i,a-1}$) thereof in the map table to obtain $z_{a/2}$~$z_{a-1}$.

The data size obtained by the XOR engine 272, 274 each time is actually determined by the transmission capability of the IM BUS 950. For example, assuming that the system sets w=32 and a=8, and the transmission capability of the IM BUS 950 is 16 bytes. Since w=32 and a=8 implies that the map table is an 8*8 matrix and it should correspond to eight number of 32-bit data. However, the data size obtained by the XOR engine 272, 274 each time is 16 bytes, so there are only data for four operation units (16 bytes/32 bits) divided according to the operation unit of 32 bits (w=32). In other words, operating twice is necessary to obtain the data ($x_0$~$x_7$) for the eight operation units (a=8).

In other embodiments, two operation modes are adopted to manage the foregoing situation, one of which is to rewrite Eq. (11) as follows:

$$Z = \begin{bmatrix} b_0 \\ b_1 \\ b_2 \\ \vdots \\ b_7 \end{bmatrix} + \begin{bmatrix} m_{0,0} & m_{0,1} & m_{0,2} & \cdots & m_{0,7} \\ m_{1,0} & m_{1,1} & m_{1,2} & \cdots & m_{1,7} \\ m_{2,0} & m_{2,1} & m_{2,2} & \cdots & m_{2,7} \\ \vdots & \vdots & \vdots & & \vdots \\ m_{7,0} & m_{7,1} & m_{7,2} & \cdots & m_{7,7} \end{bmatrix} \cdot \begin{bmatrix} x_0 \\ x_1 \\ x_2 \\ \vdots \\ x_7 \end{bmatrix}$$

$$= \left( \begin{bmatrix} b_0 \\ b_1 \\ b_2 \\ \vdots \\ b_7 \end{bmatrix} + \begin{bmatrix} m_{0,0} & m_{0,1} & m_{0,2} & \cdots & m_{0,7} \\ m_{1,0} & m_{1,1} & m_{1,2} & \cdots & m_{1,7} \\ m_{2,0} & m_{2,1} & m_{2,2} & \cdots & m_{2,7} \\ \vdots & \vdots & \vdots & & \vdots \\ m_{7,0} & m_{7,1} & m_{7,2} & \cdots & m_{7,7} \end{bmatrix} \cdot \begin{bmatrix} x_0 \\ x_1 \\ x_2 \\ x_3 \\ 0 \\ 0 \\ 0 \\ 0 \end{bmatrix} \right) +$$

-continued $$\begin{bmatrix} m_{0,0} & m_{0,1} & m_{0,2} & \cdots & m_{0,7} \\ m_{1,0} & m_{1,1} & m_{1,2} & \cdots & m_{1,7} \\ m_{2,0} & m_{2,1} & m_{2,2} & \cdots & m_{2,7} \\ \vdots & \vdots & \vdots & & \vdots \\ m_{7,0} & m_{7,1} & m_{7,2} & \cdots & m_{7,7} \end{bmatrix} \cdot \begin{bmatrix} 0 \\ 0 \\ 0 \\ 0 \\ x_4 \\ x_5 \\ x_6 \\ x_7 \end{bmatrix}$$

Or the other one is to rewrite Eq. (11) as follows:

$$Z = \begin{bmatrix} b_0 \\ b_1 \\ b_2 \\ \vdots \\ b_7 \end{bmatrix} + \begin{bmatrix} m_{0,0} & m_{0,1} & m_{0,2} & \cdots & m_{0,7} \\ m_{1,0} & m_{1,1} & m_{1,2} & \cdots & m_{1,7} \\ m_{2,0} & m_{2,1} & m_{2,2} & \cdots & m_{2,7} \\ \vdots & \vdots & \vdots & & \vdots \\ m_{7,0} & m_{7,1} & m_{7,2} & \cdots & m_{7,7} \end{bmatrix} \cdot \begin{bmatrix} x_0 \\ x_1 \\ x_2 \\ \vdots \\ x_7 \end{bmatrix}$$

$$= \left( \begin{bmatrix} b_0 \\ b_1 \\ b_2 \\ \vdots \\ b_7 \end{bmatrix} + \begin{bmatrix} m_{0,0} & m_{0,1} & m_{0,2} & m_{0,3} \\ m_{1,0} & m_{1,1} & m_{1,2} & m_{1,3} \\ m_{2,0} & m_{2,1} & m_{2,2} & m_{2,3} \\ \vdots & \vdots & \vdots & \vdots \\ m_{7,0} & m_{7,1} & m_{7,2} & m_{7,3} \end{bmatrix} \cdot \begin{bmatrix} x_0 \\ x_1 \\ x_2 \\ x_3 \end{bmatrix} \right) +$$

$$\begin{bmatrix} m_{0,4} & m_{0,5} & m_{0,6} & m_{0,7} \\ m_{1,4} & m_{1,5} & m_{1,6} & m_{1,7} \\ m_{2,4} & m_{2,5} & m_{2,6} & m_{2,7} \\ \vdots & \vdots & \vdots & \vdots \\ m_{7,4} & m_{7,5} & m_{7,6} & m_{7,7} \end{bmatrix} \cdot \begin{bmatrix} x_4 \\ x_5 \\ x_6 \\ x_7 \end{bmatrix}$$

The first equation mentioned above implies that one received data stream is divided into two data sets in sequence. When the operation of the first data set (including the data $x_0$~$x_3$) is performed, the data of the four last operation units are considered as 0 (also needed to be loaded as the initial data B and stored in the data buffer), and its operation result is stored in the data buffer as the initial data of the second data set. When the operation of the second data set (including the data $x_4$~$x_7$) is performed, the data of the four first operation units are considered as 0, and thus the data Z of this loop is obtained.

The second equation mentioned above implies that the map table is rewritten to be two 8*4 matrixes. That is, the data $x_0$~$x_3$ are computed with the four first columns of the corresponding map table (also needed to be loaded as the initial data B and stored in the data buffer). The operation result is put into the data buffer as the initial data of the operation of the data $x_4$~$x_7$, and then the data $x_4$~$x_7$ are computed with the four last columns of the map table. Thus, the data Z of this loop is obtained.

If the system adopts the latter one, each basic circuit unit of each subunit of the XOR engine just needs to dispose four AND gates. (It is noteworthy that a=8 now). That is, in a preferred embodiment, the number of the AND gates in the basic circuit unit can be determined according to the number of columns in the map table in practical operations.

Figure 8:
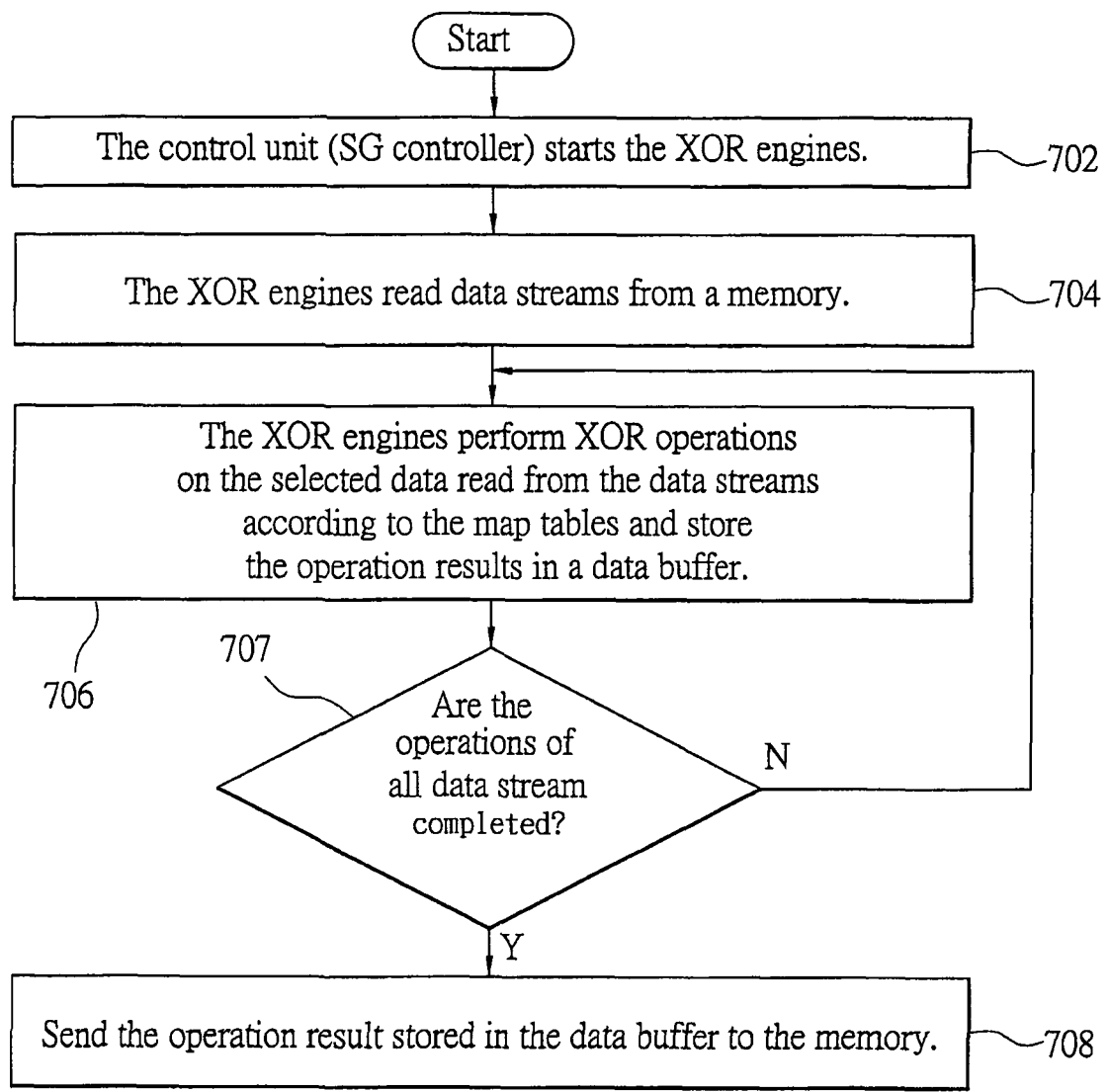
FIG. 8 is a flowchart of performing operations by the parity engine.

FIG. 8 is a flow chart showing the data generation by a parity engine 260. After the CPU 242 activates the parity engine 260, the control unit (SG controller) 264 starts at least one of the XOR engines 272, 274 (Step 702). As described above, how many XOR engines are needed to be started is chiefly based on the number of data needed by the CPU 242 through the generation of the parity engine 260. For example, two XOR engines 272, 274 are needed to be started simultaneously by the control unit (SG controller) 264 if the CPU 242 needs to start the parity engine 260 to separately calculate two parities P, Q. Or, only the first XOR engine 272 is needed to be started by the control unit (SG controller) 264 if the CPU 242 just needs to start the parity engine 260 to recover a user data. After the XOR engines 272, 274 are activated by the control unit (SG controller) 264, the XOR engines 272, 274 issue a data read request to the memory 280 for reading a plurality of data streams for operations (Step 704). After the XOR engines 272, 274 receive the data streams, the data in the data streams are selected and performed XOR operations according to the corresponding map tables stored in the control unit buffer (SG buffer) 266, and the operation results are stored in the data buffers 276, 278 (Step 706). Then, the XOR engines determine whether the operations of the data streams are completed or not; namely, the last loop of the operations is performed or not (Step 707). If no, then return to Step 706; if yes, then the operation results stored in the data buffer 276, 278 will be stored in the memory 280.

As described above, the parity engine 260 is a kernel of generating data in the invention, and it is because the XOR engines 272, 274 perform operations according to the map tables stored in the control unit buffer (SG buffer) 266. Therefore, the method of generating map tables is first described as follows:

In one embodiment, the CPU 242 generates the map tables corresponding to all values in $GF(2^a)$ according to the selected domain of the Galois Field when the system boots, and the map tables are stored in the memory 280. When the CPU 242 starts the parity engine 260 and intends to perform operations on certain data streams, the control unit (SG controller) 264 is notified to learn the memory addresses of the map tables needed in the operations and corresponding to the data streams, so that the control unit (SG controller) 264 can issue read requests to the memory 280 on by one to load the required map tables into the control unit buffer (SG buffer) 266. Or, before the CPU 242 starts the parity engine to perform operations on certain data streams, the map tables needed in the operations and corresponding to the data streams are collected, compiled and stored in the memory 280 in sequence. Taking $GF(2^8)$ as an example, the memory stores the map tables corresponding to the values of 0~255. Assuming that the CPU 242 intends to perform operations of 1*A+ 5*B+20*C on three data streams A, B, C, the CPU 242 will retrieve the map tables corresponding to the values of 1, 5, and 20 from the memory 280 and store them in sequence in another storage space in the memory 280. After the CPU 242 arranges the required map tables, the CPU 242 informs the register 268 to start the control unit (SG controller) 264 and to inform the control unit (SG controller) 264 the start memory address of the required map tables, so that the control unit (SG controller) 264 can issue a read request to the memory 280 to load the required map tables into the control unit buffer (SG buffer) 266. After the map tables are already loaded, applying the foregoing procedure, the XOR engines 272, 274 can select data from each operation unit in the data streams according to the setting of the operation unit and the content of the map tables to perform XOR operations.

In another embodiment, the map tables corresponding to all values in the selected domain of $GF(2^a)$ can be stored in the memory 280 in advance before leaving the factory. Then, the following is carried out as the foregoing processes.

Or, in another embodiment, the map tables corresponding to all values in $GF(2^a)$ are directly stored in the parity engine 260 rather than in the memory 280, no matter that they are generated when the system boots or before leaving the factory. For example, referring to the dotted lines shown in FIG. 6, a map table buffer 269 is disposed in the parity engine 260 and it is coupled with the control unit (SG controller) 264 and the control unit buffer (SG buffer) 266, respectively. The map table buffer 269 is used to store the map tables corresponding to all the values. When the CPU 242 needs to perform operations on certain data streams, an index can be created for indexing the map tables corresponding to the data streams waiting to be processed, so that the control unit (SG controller) 264 can know which map table is required for each data stream according to the index. Then the map tables are transmitted from the map table buffer 269 to the control unit buffer 266 for a temporary storage according to the operation sequences of the data streams. Afterwards, the XOR engine can perform operations according to the map tables stored in the control unit buffer (SG buffer) 266 as described above.

The flow chart shown in FIG. 8 will be described with more details together with FIG. 6 as follows. In order to improve the efficiency of the parity engine, one embodiment of the present invention further comprises the following steps. The CPU 242 can compile and store the operation information required for operations in the memory 280 before the CPU 242 starts the parity engine 260 for operations. The operation information should include the settings and information required by the parity engine 260 for the operations so as to activate the control unit (SG controller), the operation information such as the storing address of each data stream which is to be processed, the memory addresses or index of the map tables required for operations, or the memory address for storing the operation result. After the CPU 242 establishes the operation information, the start address of the memory for storing the operation information is filled in the register 268, and the register 268 will trigger and activate the control unit (SG controller) 264 and send the start address of the memory to the control unit (SG controller) 264. Then, the control unit (SG controller) issues a request to the memory controller 920 for reading the operation information via the IM bus interface 262 and the IM bus 950 according to the start address of the memory. The memory controller 920 in light of the request temporarily stores the operation information in the control unit buffer (SG buffer) 266 from the memory 280 via the IM bus 950 and the IM bus interface 262. After the control unit (SG controller) 264 obtains the operation information, the control unit (SG controller) 264 operates according to the operation information. Firstly, the map tables required for operations are created in the control unit buffer (SG buffer) 266 (the way how to generate the map tables in the buffer (SG buffer) 266 are already described above, and thus the details are omitted here). Secondly, the two XOR engines 272, 274 are started to perform the operations for generating the required parity data or the rebuilt data according to the operation information and map tables stored in the control unit buffer (SG buffer) 266.

The way that the CPU 242 compiles and stores the operation information in the memory 280 is to follow a predefined data transfer protocol format, and thus an operating instruction list is created. Referring to FIG. 9, it is a preferred embodiment of the operating instruction list showing the fields and contents therein according to the present invention. The operating instruction list includes:

1. Related Index Field (Next-SG-List-Addr), used to indicate the memory address of the next operating instruction list.

In this embodiment, the concept of a scatter-gather-list (Scatter-Gather (SG)-list) is adopted to design the field, and thus linking connections between the operating instruction lists is generated to allow the control unit (SG controller) to be able to find the next operating instruction list and carry out the next process automatically by following this field. In other words, a linking connection is generated between two of the operations, and thus the CPU 242 does not need to inform the register 268 every time for each operation. To these operating instruction lists (SG-Lists) with linking connections, the CPU 242 simply needs to send the start address storing the first SG-List to the register 268, and then the parity engine 260 will complete the operations one by one in sequence designated by all SG-Lists with linking connections. That is to say, a plurality of operations corresponding to the operating instruction lists are activated at a time so as to improve the operation efficiency. In this embodiment, this field is filled in with zero if there is no other operation needed to be performed after the operation designated by this list is completed.

2. Interrupt (I) Field, used to determine whether an interrupt signal is needed to be generated to inform the CPU after the data operation designated in this list is completed.

3. Basic XOR element count (ElemCnt), equal to the "a" value of the $GF(2^a)$ adopted by the map tables. For example, if $GF(2^8)$ is adopted, then this field is filled in with 8.

4. Basic XOR element Size (ElemSiz), used to set the length of the operation unit (w bits). In this embodiment, the content of this field is a power of 2. For example, if the content of this field is 5, it means that the length of the operation unit is $2^5=32$ bits, which is a basic unit.

5. Start Simple XOR Operation Indication Field (S).

In this embodiment, certain situations are taken into consideration. For example, only the RAID-5 function is performed, or only the P value is needed to be calculated in the RAID-6, or just one disk drive is damaged or has errors so that its data needs to be recovered. In these situations, the operation formulas performed by the XOR engine are pretty simple (as shown in Eqs. (1) or (1')); that is, the multipliers of the data streams are all equal to 1, so it is not necessary to download the map tables. Therefore, this field is set for further improving the processing efficiency. If this field is set (to be, such as, 1), then the corresponding activated XOR engine need not look up the map tables stored in the controller unit buffer and can directly perform simple XOR operations on each data stream.

6. XOR Number Bit Field (ElemCombCnt), used to determine the number of XOR engines for performing data operations. For example, if the system only performs the RAID-5 function or performs the RAID-6 function but only the P value or a user data set required to be calculated, thus this field will be set to 1. Or, if two data sets (such as, any two of P, Q values or user data) are required to be calculated in the RAID-6 system at the same time, this field will be set to 2.

7. A Plurality of Data Stream Address Fields (StreamBseAdr0~n−1), used to indicate the start addresses in the memory storing the data streams. The number n of this field is preferably equal to or greater than the number of user data disks in the disk array adopted by the system. For example, the number n of this field can be set to 16 in the RAID-6 system adopting 16 user data disks and 2 parity disks.

8. Number of Data Stream (StreamCnt), used to indicate the number of data streams in operations, and its maximum should be equal to the number n of data stream address fields.

9. Total Length of Streams (StreamLng), used to indicate the total length of data streams in operations.

10. A Plurality of Generalized XOR Descriptors. The number of such fields is preferably equal to the number of the parities adopted by the system. For example, the number of such field should be two if the system has two parities (P and Q), and three if the system has three parities. The preferred embodiment of the invention takes a RAID-6 system with two parities (P and Q) as an example, so there are a first generalized XOR descriptor and a second generalized XOR descriptor corresponding to the first and second XOR engines 272, 274, respectively. Each the generalized XOR descriptor includes a memory address field for storing the address of the operation result and another memory address field for storing the address of the map tables required by the XOR engines in operations. If it is not necessary to load the map tables in some situations as described above, the corresponding memory address for storing the map tables is filled in with 0. Furthermore, as described above this field can be filled in with the start address or the index in light of the method adopted by the system.

11. The field of preload previous results (P) is a two-bit field, such as 0 and 1. If this field is set, for example, to 1, according to the address in the memory address field for storing the operation result in the first and the second generalized XOR descriptors, the first and second XOR engines 272, 274 will load the data streams from the memory to the first and second data buffers 276, 278 as the initial data of this XOR operation. This field has the following two effects:

The first one is shown when data update is performed to the disk drive. For example, if the CPU intends to update a data stream $D_1$ in the disk drive B to a data stream $D_1'$, it is necessity to use the parity engines to compute the values of the corresponding new parities P' and Q'. In one embodiment, the old data $D_1$ and the corresponding old parities P and Q are used to find the new parities P' and Q' by the following formulas:

$$P'=P+D_1+D_1'$$

$$Q'=Q+2^1*D_1+2^1*D_1'$$

The old parities P and Q are stored respectively in the memory addresses indicated in the memory address fields used to store the operation results of the first and second generalized XOR descriptors. Then, the operating instruction list is set to performs operations $(D_1+D_1'$ and $2^1*D_1+2^1*D_1')$ on the old data stream $D_1$ and the new data stream $D_1'$, and to set up this P field, such as setting it to be 1.

Because the P field is set up, the first and second XOR engines 272, 274 will read data from the memory and load the data into the corresponding first and second data buffers 276, 278 according to the memory addresses indicated in the memory address fields used to store the operation results of the first and second generalized XOR descriptors before the two XOR engines 272, 274 perform operations, and the data is used to be the initial data for the operations. Thus, in the beginning of the operations the first and second XOR engines will load in the old parities P, Q from the memory addresses indicated in the memory address fields used to store operation results, and use the data as the initial data for the operations. Therefore, after the first and second XOR engines 272, 274 perform the operations on the data streams $D_1$, $D_1'$ in sequence, the operation results are the required new parities P' and Q'.

The second one is to manage the situation when the number of disk drives in a system is increased. As described above, the number of data streams capable of being operated at one operation has a maximal limit of n according to the setting of this data transfer protocol format. If the system needs to increase the number of data disk drives to be larger than n in a later time, the situation will occur that the number of operated data streams is larger than the maximum limit of n. In this embodiment, the data streams can be divided into groups and several corresponding operating instruction lists are built separately. In each of the operating instruction lists, the related index field (Next-SG-List-Addr) is filled in with the memory address of the next operating instruction list, so that a linking connection is created between them. And, the contents of the memory address fields used to stored the operation results of the first generalized XOR descriptors in the operating instruction lists are the same. Similarly, the contents of the memory address fields used to stored the operation results of the second generalized XOR descriptors in the operating instruction lists are also the same. Therefore, when the XOR engines 272, 274 perform operations in light of each of the operating instruction lists, the final operation results will be stored at the same memory addresses according to the contents of the memory address fields. Except the first operating instruction list, the P fields of the remaining operating instruction lists are set to 1 so that the data stored in the memory addresses indicated in the memory address fields that store the operation results are loaded as the initial data for this operation. In other words, the last operation result will be loaded as the initial data for the next operation. Therefore, the operation results of the last one of the operating instruction lists are the final operation results of all data streams. Thus, the interrupt (I) field of the last operating instruction list can be set to 1 and the one of the remaining operating instruction lists set to 0.

For example, assuming that the maximum limit of data streams is 16, and the number of data streams actually needed to be operated is 32. It is the situation that data is written into the 32 user data disks and the corresponding values of P and Q are required to be recomputed.

$$P=D_0+D_1+D_2+\ldots+D_{30}+D_{31}$$

$$Q=2^0*D_0+2^1*D_1+2^2*D_2+\ldots+2^{30}*D_{30}+2^{31}*D_{31}$$

The first and second operating instruction lists with a linking connection between them are created, where the field of preload previous results (P) of the second operating instruction list is set to 1. The first operating instruction list is used to compute the data streams of the first $D_0$~$D_{15}$ as follows:

$$D_0+D_1+D_2+\ldots+D_{14}+D_{15}=\Delta P_{15} \text{ and}$$

$$2^0*D_0+2^1*D_1+2^2*D_2+\ldots+2^{14}*D_{14}+2^{15}*D_{15}=/\Delta Q_{15}$$

The operation results will be stored in the memory according to the memory addresses indicated by the contents of the first and second memory address fields, which are used to store operations results.

The second operating instruction list is used to compute the succeeding data stream $D_{16}$~$D_{31}$. Since its P field is set up, the previous operation results are loaded into the data buffers 276, 278 from the memory to be the initial data according to the memory addresses indicated by the contents of the first and second memory address fields, which are used to store operation results, and thus the operations of the second operating instruction list is described as follows:

$$\Delta P_{15}+D_{16}+D_{17}+D_{18}+\ldots+D_{30}+D_{31}=P$$

$$\Delta Q_{15}+2^{16}*D_{16}+2^{17}*D_{17}+\ldots+2^{30}*D_{30}+2^{31}*D_{31}=Q$$

Therefore, the operation results of the second operating instruction list are actually the values of P and Q.

The data transfer protocol format shown in FIG. 9 is a preferred embodiment, and it may be modified in practice. For example, the fields about the stream lengths, the number of operation units, and the size of the operation units can be fixed and default setting in the system, and thus those fields can be omitted in the list. In an embodiment without the field of preload previous results (P), if it is necessary to compute the new parity data using the new and old user data and the old parity data to manage the foregoing situation of data updating, the created operating instruction list also considers the old parity data as a data stream waiting to be processed. For example, as the aforementioned embodiment, system needs to use the following formulas to obtain the new parity data of P' and Q':

$$P'=P+D_1+D_1'$$

$$Q'=Q+2^1*D_1+2^1*D_1'$$

It means that the data streams required to be operated include P, Q, $D_1$ and $D_1'$. Therefore, the system has to modify the foregoing formulas as follows to establish the corresponding operating instruction list and start the parity engine for the operations.

$$P'=P+0*Q+D_1+D_1'=2^0*P+0*Q+2^0*D_1+2^0*D_1'$$

$$Q'=0*P+Q+2^1*D_1+2^1*D_1'$$

Wherein, among the map tables required by the data streams for computing the new parity P', the map table corresponding to the old parity Q is equal to "0". And, among the map tables required by the data streams for computing the new parity Q', the map table corresponding to the old parity P is equal to "0".

Furthermore, in the embodiment without the field of preload previous results (P), if the number of the data streams is larger than the maximum limit as the situation described above, similarly, several operating instruction lists can be separately created with a linking connection between them, and the related index field (Next-SG-List-Addr) of each operating instruction list is filled in with the memory address of the next operating instruction list so as to establish the linking connection. However, the difference resides in that each succeeding operating instruction list regards the last operation result as one of the data streams and processes it by the technique similar to the process for updating data.

Assuming that the maximum limit of data streams is 16 and the number of user data disks is 32, the values of P and Q corresponding to the written data in the 32 data disks are calculated as follows:

$$P=D_0+D_1+D_2+\ldots+D_{30}+D_{31}$$

$$Q=2^0*D_0+2^1*D_1+2^2*D_2+\ldots+2^{30}*D_{30}+2^{31}*D_{31}$$

A first operating instruction list, a second operating instruction list and a third operating instruction list with a linking connection between them are established. The first operating instruction list is used to perform operations on the data streams of $D_0 \sim D_{15}$ as follows:

$$D_0+D_1+D_2+\ldots+D_{14}+D_{15}=\Delta P_{15} \text{ and}$$

$$2^0*D_0+2^1*D_1+2^2*D_2+\ldots+2^{14}*D_{14}+2^{15}*D_{15}=\Delta Q_{15}$$

In the second operating instruction list, the operation results $\Delta P_{15}$ and $\Delta Q_{15}$ obtained from the first operating instruction list are considered as two data streams. Namely, the second operating instruction list is used for the operations of the succeeding data streams of $\Delta P_{15}$, $\Delta Q_{15}$, and $D_{16} \sim D_{29}$. Among the map tables required by the data streams for computing the P value, the map table corresponding to the second data stream $\Delta Q_{15}$ is equal to "0", and among the map tables required by the data streams for computing the Q value, the map table corresponding to the first data stream $\Delta P_{15}$ is equal to "0". Thus, the operations based on the second operating instruction list are given as follows:

$$\Delta P_{15}+0*\Delta Q_{15}+D_{16}+D_{17}+\ldots+D_{28}+D_{29}=\Delta P_{29}$$

$$0*\Delta P_{15}+\Delta Q_{15}+2^{16}*D_{16}+\ldots 2^{28}*D_{28}+2^{29}*D_{29}=\Delta Q_{29}$$

Then, a similar procedure is performed based on the third operating instruction list like the one performed in the second operating instruction list. The operation results $\Delta P_{29}$ and $\Delta Q_{29}$ of the second operating instruction list are regarded as two data streams. Namely, the third operating instruction list is used for the operations of the succeeding data streams of $\Delta P_{29}$, $\Delta Q_{29}$, $D_{30}$, and $D_{31}$, and thus the operations based on the third operating instruction list are given as follows:

$$\Delta P_{29}+0*\Delta Q_{29}+D_{30}+D_{31}=P$$

$$0*\Delta P_{29}+\Delta Q_{29}+2^{30}*D_{30}+2^{31}*D_{31}=Q$$

Therefore, three operating instruction lists are needed by means of this method to obtain the required values of P and Q.

Another embodiment is brought up below for illustration. However, the invention is not limited to such embodiments only in practice. Assuming that a storage system works with the RAID-6 mechanism having two parities and the CPU intends to update the data stream $D_1$ in the disk drive B to a new data stream $D_1'$. It is necessary to use the parity engines to compute the corresponding new parities of P' and Q'. In one embodiment, the new parities of P' and Q' are obtained by the following formulas:

$$P'=P+D_1+D_1'=P+2^0*D_1+2^0*D_1'$$

$$Q'=Q+2^1*D_1+2^1*D_1'$$

where, "+" stands for an XOR operation.

As described above, if $GF(2^8)$ is adopted, then the map table of $M_1$ corresponding to $2^1$ is shown below:

$$M_1 = \begin{bmatrix} 0 & 0 & 0 & 0 & 0 & 0 & 0 & 1 \\ 1 & 0 & 0 & 0 & 0 & 0 & 0 & 0 \\ 0 & 1 & 0 & 0 & 0 & 0 & 0 & 1 \\ 0 & 0 & 1 & 0 & 0 & 0 & 0 & 1 \\ 0 & 0 & 0 & 1 & 0 & 0 & 0 & 1 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \end{bmatrix}$$

In this embodiment, assuming that the CPU 242 stores the map tables required for computing the Q' value in the sequence of ($M_1$, $M_1$) in the memory and the start address in the memory for storing the value is 1000__0000. Moreover, assuming that the length of each of the data streams is 512 bytes, and the CPU stores the old parities P and Q in the memory addresses of A000__0000 and B000__0000, respectively.

Then, the CPU creates an operating instruction list according to the foregoing data transfer protocol format, and the start address for storing the list is assumed to be 0000__0100. Referring to FIG. 10 showing an example of the list. The related index field is set to 8000__0000 which indicates that the next operating instruction list to be processed is stored at the memory address of 8000__0000. The interrupt (I) field is set to 1, so that the control unit (SG controller) 264 will generate an interrupt signal to inform the CPU 242 after the operations performed by the parity engine 260 are completed. The basic XOR element count (ElemCnt) field is set to 8, since $GF(2^8)$ is adopted. The basic XOR element size (ElemSiz) field is set to 5, indicating that the operation unit is $2^5=32$ bits which is a basic unit. The start simple XOR operation indication (S) field is set to 1, because one of the XOR engines is used to compute the P value. The XOR number bit field (ElemCombCnt) is set to 2, because two XOR engines 272, 274 are activated simultaneously to compute the values of P and Q. The number of data streams (StreamCnt) field is set to 2, because there are two data streams $D_1$, $D_1'$ required to be operated. The total length of streams (StreamIng) field is set to 512, because the length of the entire data $D_1$, $D_1'$ is 512 bytes. The address field for storing the address of the operation result in the first generalized XOR descriptor subfield is filled in with the memory address of A000_0000 which will store the obtained P value and it means that the operation result of the first XOR engine 272 should be stored at the memory address of A000_0000, and the address field for storing the address of the map table is filled in with 0 because no map table is needed to be downloaded when computing the P value. The address field for storing the address of the operation result in the second generalized XOR descriptor subfield is filled in with the memory address of B000_0000 which will store the obtained Q value and it means that the operation result of the second XOR engine 274 should be stored at the memory address of B000_0000, and the address field for storing the address of the map table is filled in with 1000_0000. The first two of the plurality of data stream address fields are filled in with the start addresses of the data streams $D_1$, $D_1'$, respectively. The field of preload previous results (P) is set to 1, indicating that the first XOR engine 272 will load the data from the memory to the data buffer 276 as the initial data of the XOR operations according to the address of A000_0000 filled in the address field for storing the operation result address in the first generalized XOR descriptors, and the second XOR engine 274 will load the data from the memory to the data buffer 278 as the initial data of the XOR operations according to the address of B000_0000 filled in the address field for storing the operation result address in the second generalized XOR descriptors.

When the CPU 242 fills a start address of 0000_0100 storing this operating instruction list in the register 268, the register 268 triggers the control unit (SG controller) 264 and sends the start address 0000_0100 storing the operating instruction list to the control unit (SG controller) 264. The control unit (SG controller) 264, according to the start address, goes to the memory 280 to read the operating instruction list via the IM bus interface and the IM bus, and temporarily stores the operating instruction list in the buffer (SG buffer) 266. The control unit (SG controller) 264, according to the start address of 1000_0000 stored in the address field in the second generalized XOR descriptor, goes to the memory to read the map tables $M_1$, $M_1$ required for the operations performed by the second XOR engine 274, and temporarily stores $M_1$, $M_1$ in the control unit buffer (SG buffer) 266. Then, the control unit (SG controller) 264 activates two XOR engines 272, 274 according to the content of "2" in the XOR number bit (ElemCombCnt) field.

The two XOR engines 272, 274 will separately operates according to the information shown in the fields of the list. Since the S field is set to 1, the first XOR engine 272 will start a default simple XOR operation.

Assuming that the operation logic of each loop computed by the XOR engines 272, 27 is that the initial data of each loop except the first loop whose initial data is 0, is the operation results of the last loop, and the operation results of each loop of each XOR engine will be stored temporarily in the data buffer. Therefore, before the XOR engine 272, 274 perform operations on each loop, the data stored in the data buffer 276, 278 will be loaded in as the initial data of the XOR operations. According to such loop operations, the initial data of the first loop is equal to 0. Namely, the spaces for storing the operation results in the two data buffers 276, 278 are cleared to zero. However, since the P field is set to 1, indicating that it is necessary to load data from a memory as the initial data of the XOR operations, therefore in this embodiment, the first XOR engine 272 will load the old parity data P from the memory to the data buffer 276 as the initial data of the XOR operations according to the address of A000_0000 filled in the address field for storing the operation result address in the first generalized XOR descriptors, and the second XOR engine 274 will load the old parity data Q from the memory to the data buffer 278 as the initial data of the XOR operations according to the address of B000_0000 filled in the address field for storing the operation result address in the second generalized XOR descriptors.

Afterwards, the XOR engines read the data streams $D_1$, $D_1'$ from the memory via the IM bus interface 262 according to the start address of the data streams $D_1$, $D_1'$ filled in the StreamBseAdr0 field and the data stream length of 512 bytes in the StreamLng field.

Moreover, since the data transmission is influenced by the transmission capability of the IM bus 950, the data streams are usually loaded in several times. For example, if the transmission capability of the IM bus 950 is 32 bytes, it will take 16 ($^{512}/_{32}$) times to complete the transmission of the data streams $D_1$, $D_1'$. In other words, the data stream $D_1$ is divided into $D_{1-0} \sim D_{1-15}$ and the data stream $D_1'$ is divided into $D_{1-0}' \sim D_{1-15}'$ for the data transmission. For corresponding to the separate transmission of the data streams in the following description, the old and new parities Q and Q' are replaced by $Q_0 \sim Q_{15}$ and $Q_0' \sim Q_{15}'$, respectively.

Each time when the XOR engines receive data, the data is divided every 32 bits, which is one operation unit and is learned from the value of "5" in the basic XOR element size (ElemSiz) field, for operations, and the operation results are stored in the data buffers 276, 278. Take the second XOR engine 274 as an example, which is used to compute the Q value. When the second XOR engine 274 receives the data stream $D_{1-0}$ transmitted from the IM bus interface 262, the data stream $D_{1-0}$ is divided into eight data units $d_{1-0,0} \sim d_{1-0,7}$ every 32 bits as one operation unit. The data stored in the data buffer 278 is loaded as the initial value of the XOR operations (Now, the initial data is the old parity data $Q_0$). Following the map table $M_1$ corresponding to the data stream $D_1$ and stored in the control unit buffer (SG buffer) 266, the data selection (AND) and XOR operations are performed one by one based on the corresponding relation between the eight elements in the first row of the map table and the eight data units $d_{1-0,0} \sim d_{1-0,7}$, respectively, and going on until the last row to generate $Q_0 + 2^1 * D_{1-0}$, and the result is temporarily stored in the data buffer 278. The foregoing procedure is repeated until all $Q + 2^1 * D_1$ is generated.

After the data stream $D_1$ is completely processed, the second XOR engine 274 follows the same measures described above to load the data stream $D_{1-0}'$ transmitted from the IM bus interface 262 to the data buffer 278 as the initial value for the XOR operations (Now, the initial value is $Q_0 + 2^1 * D_1$). The data stream $D_{1-0}'$ is divided every 32 bits into eight data units $D_{1-0,0}' \sim D_{1-0,7}'$, each of which is an operation unit. Following the map table $M_1$ corresponding to the data stream $D_1'$ and stored in the control unit buffer (SG buffer) 266, the data selection (AND) and XOR operations are performed one by one based on the corresponding relation between the eight elements in the first row of the map table and the eight data units $d_{1-0,0}' \sim d_{1-0,7}'$, respectively, and going on until the last row to generate $Q_0'$, and the result is temporarily stored in the data buffer 278. The foregoing procedure is repeated until all 512 bytes of the Q' value are generated. The Q' value is written from the data buffer 278 to the address designated by the memory address field for storing the operation result.

Since the data transmission is influenced by the data transmission capability of the IM bus 950 as described above, each of the data streams is divided into batches to be separately transmitted. Such as the foregoing example, the data transmission capability of the IM Bus 950 is 32 bytes, and the length of the data streams $D_1$, $D_1'$ is 512 bytes, so each data stream is divided into 16 batches for the data transmission. As a result, the XOR engine will start counting when the first data set $D_{1-0}$ is received, so as to determine whether the transmission of the data stream $D_1$ is completed or not and it is time to enter into the next loop for computing the data stream $D_1'$. If yes, the preparation process required by the next loop corresponding to the data stream $D_1'$ will be carried out, such as changing the map tables into the ones corresponding the data stream $D_1'$. Therefore, if the embodiment adopts an IM Bus 950 system having a pipelining capability, the XOR engine can sequentially issue read requests one by one according to the start memory addresses of the data streams indicated in the content of the operating instruction list, without waiting for an appropriate time that assures the safety of processing the data stream before sending out the read request for reading the next data stream.

However, assuming that the transmission capability of the IM bus 950 of the system is 16 bytes and 200 MHz; namely, the XOR engine can read a data set of 16 bytes each time, which is smaller than 32 bytes (32 bits*8), the size of each block unit set by the system. Therefore, the data streams $D_0$, $D_1$ with a length of 512 bytes require 32 times to complete the transmission of one of the data stream. Since the XOR engine receives a data set of 16 bytes each time, there are only four data units if the data set is divided by an operation unit of 32 bits, and it does not meet the requirement of "eight" data units indicated in the operating instruction list. Thus, in this embodiment, the XOR engine can integrate the data processed every two times and store them in a data buffer. The related integration technique has been described previously, and thus will not be described again here.

After the parity engine 260 stores the new computed parity data P', Q' in a memory, the control unit (SG controller) 264 issues an interrupt signal to the CPU 242 according to the setting of the interrupt (I) field. Then, the control unit (SG controller) 264 follows the content of the related index field to read the operating instruction list stored at the memory address of 8000_0000 and continues the related processing.

In general, the RAID system needs to update the parity data for each writing action. Namely, the parity engine is needed to be activated to compute the new parity data. Thus, it is very likely to have the situation that a new operation requirement occurs while the parity engine is processing an operating instruction list.

If the foregoing situation occurs, in one embodiment, the CPU 242 will create a new operating instruction list corresponding to the new operation and permit of inserting the new operating instruction list or it follows the old incomplete operating instruction list. Take an example as follows. The register 268 is designed to be mapped with the content of the related index field of the operating instruction list stored in the control unit buffer (SG buffer) 266 of the parity engine 260. When the content stored in the register 268 is updated, the content of the related index field stored in the control unit buffer (SG buffer) 266 is also mapped and updated. Thus, by changing the content of the related index field in the register 268 or by changing the content of the related index field of a "not-yet" processed operating instruction list in a serial of linking operating instruction lists, the CPU can change the start address into the one of the new operating instruction list, and the content of the related index field of the new operating instruction list is filled in with the start address of the operating instruction list originally following behind the inserted point. If there is no other operating instruction list following behind the inserted point, zero will be filled in. Thus, a linking connection is created between the last and the next operating instruction lists to allow the parity engine to automatically process the linking.

Figure 11:
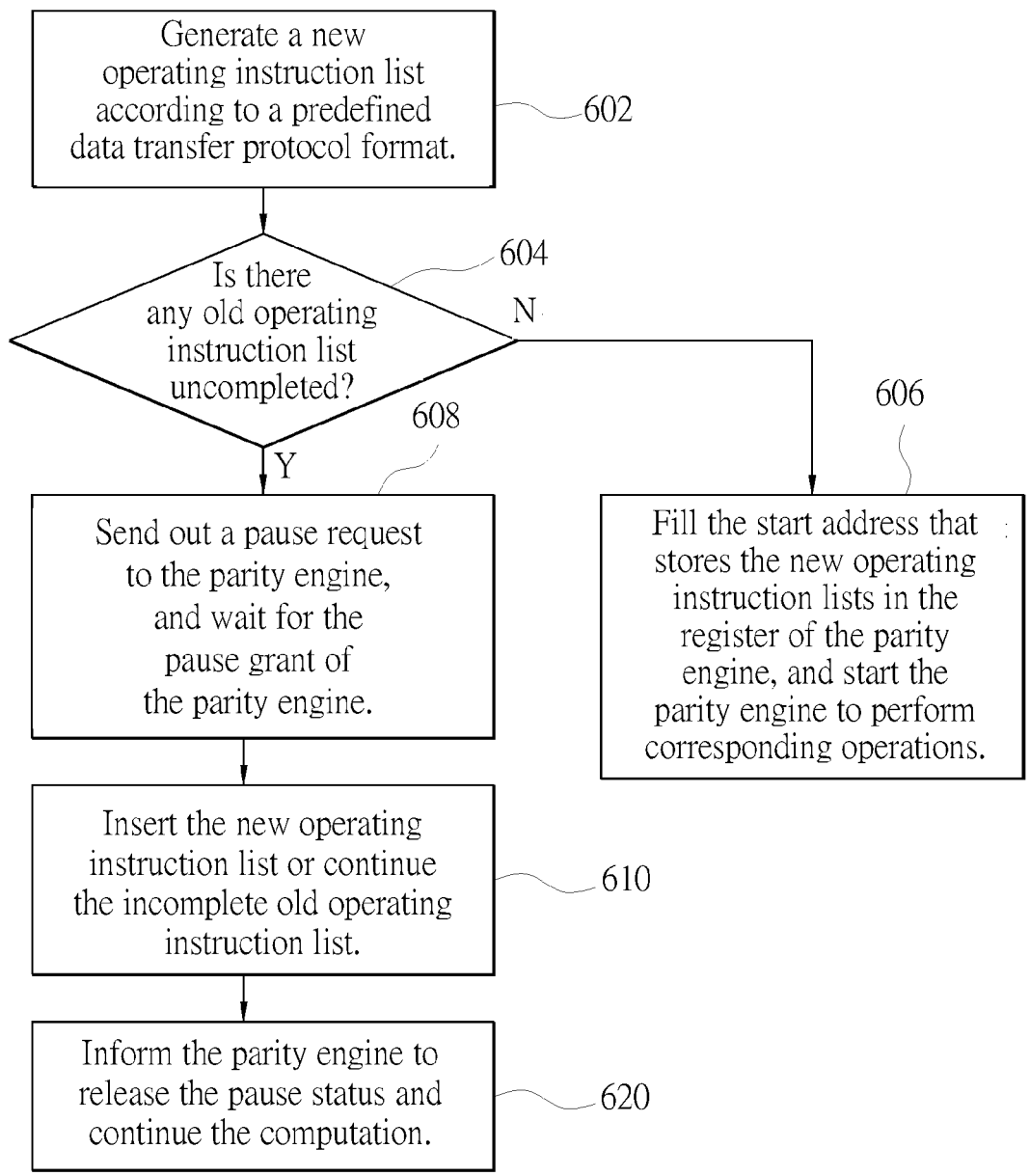
FIG. 11 is flowchart of inserting or continuing the linking process by the CPU.

Referring to FIG. 11 for further illustrations, the CPU creates at least one new operating instruction list (Step 602). Then, the CPU determines whether there is an old operating instruction list uncompleted (Step 604). The determination result of this step can be learned by whether the parity engine has sent an interrupt signal to the CPU. If there is no incomplete old operating instruction list existed, the start address for storing the new operating instruction list is filled in the register so as to start the parity engine to perform the operations corresponding to the new operating instruction list (Step 606). If there is still incomplete operating instruction list existed, the CPU will send out a pause request to the parity engine to ask the parity engine to pause. When the parity engine receives the request, the control unit will perform a pause mechanism to pause the current operating action, and then reply a pause grant (Pause Gnt) to the CPU (Step 608). The pause mechanism could be, for example, to put off the action of entering the next operating instruction list after the current operating instruction list is completed. After the pause grant is received, the CPU starts inserting or continuing the linking process as follows (Step 610). An incomplete operating instruction list in the register or in the previous set of operating instruction lists is selected. The setting of the related index field of the last operating instruction list in the new operating instruction lists is equal to the content of the related index field originally set in the previously-selected incomplete operating instruction list or the one in the register. In addition, the related index field in the register or the previously-selected incomplete operating instruction list is changed into the start address (that stores the address of the first operating instruction list) stored in the later-generated operating instruction list. Therefore, the inserting action that the later-generated operating instruction list is inserted into the previous one is completed, so as to create a linking connection between two operating instruction lists. Before the inserting or continuing action is performed, the CPU can learn which operating instruction list is being carried out by the parity engine by reading the content of the related index field in the register. After the liking connection is created between the new operating instruction list and the existed one which is to be processed, the parity engine is informed to release the pause status. Then, the register will recover the pause action, and continue the automatic linking process according to the new linking connection.

In the foregoing description, before the CPU performs the linking process of two operating instruction lists, the reason of needing to send out a pause request is for preventing a conflict from causing an error while the CPU is changing the content of the related index field of a operating instruction list or in the register and at the same time the parity engine is reading the content of the operating instruction list.

Moreover, if the CPU requires to integrate, modify or delete a operating instruction list, similar to the inserting or continuing linking process described above, the CPU can read the content of the related index field from the register to learn the messages such as whether the parity engine needs to process a next operating instruction list or where the next operating instruction list to be processed is located. In other words, the CPU can know which operating instruction lists are not processed by the parity engine yet. Thus, the CPU can determine whether the operating instruction list that it intends to integrate, modify or delete is the one that is not processed yet by the parity engine. If yes, then the CPU can integrate, modify or delete the operating instruction list.

When the CPU carries out the aforementioned procedure of modification or deletion and before the information in the register is read, a pause request can be also issued to ask the register to pause the current operation and the read process is then performed after receiving a pause grant, so as to prevent a conflict occurring when the parity engine keeps performing the data operations and the CPU carries out the procedure of modification or deletion. Similarly, the CPU will inform the parity engine to release the pause status to continue its previous operation after the entire modification or deletion process is completed.

The accompanying drawings are provided for reference and illustration only, but not intended to limit the scope of the present invention.

In sum of the description above, the present invention relates to a disk array controller and to a method of generating data by a parity engine, wherein the parity engine uses map tables to perform XOR operations on the data so as to generate parity data or recover data and it results in warding off complicated multiplicative operations.

One embodiment of the invention further discloses a predefined data transfer protocol format for establishing an operating instruction list by the CPU, which contains the operation information able to activate the parity engine to generate data. The storing address of the operating instruction list is filled in the register of the parity engine, so that the parity engine will read the operating instruction list and perform the corresponding operations. In one embodiment, the operating instruction list has a related index field used to indicate the memory address of the next operating instruction list so as to create a linking connection between the previous incomplete operation and the next new one, so that the parity engine can continue the processing automatically, and the CPU does not need to wait for the completion of an operation performed by the parity engine before issuing an operating command to the parity engine. In a RAID system, each write-in operation needs to update the corresponding parity data, which means it is necessary to start the parity engine to compute the new parity data. Thus, it is understandable that after the system is booted, the operations needed to be performed by the parity engine will be continuously coming. Therefore, setting up the operating instruction list is greatly saves the time for communication between the CPU and the parity engine. Since the parity engine can use this operating instruction list to learn the storing address of each data stream, therefore the parity engine can issue read requests one by one according to the start memory address of each data stream if the IM bus adopted by the embodiment has a pipelining capability, so as to improve the operation efficiency of the parity engine.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A parity engine for use in a storage virtualization controller, comprising:
    a control unit;
    a control unit buffer, serving as a data buffer of the control unit and storing a map table required for an operation;
    at least one XOR engine, being started by the control unit, and used to select data from a data stream according to the map table stored in the control unit buffer for performing an XOR operation; and
    at least one data buffer, serving as the data buffer of the XOR engine during an operating process;
    wherein the XOR engine includes a subunit having at least one basic circuit unit, and the basic circuit unit comprises:
        a plurality of AND gates, each having an input end corresponding to each bit of data in the data stream, and having another input end corresponding to each element of the map table, so as to select data in the data stream according to the map table; and
        a plurality of XOR gates, used to perform XOR operations on the outputs of the plurality of AND gates, and outputting operation results to the data buffer of the XOR engine.

2. The parity engine of claim 1, wherein one of the plurality of XOR gates has an input end corresponding to data loaded from the data buffer of the XOR engine.

3. The parity engine of claim 2, wherein the data loaded to the XOR gate from the data buffer of the XOR engine is an operation result which is computed by the parity engine in the last time.

4. The parity engine of claim 1, wherein the number of the basic circuit units disposed in the subunit is equal to the number of bits of an operation unit of the data stream.

5. The parity engine of claim 1, wherein the number of the plurality of AND gates disposed in the basic circuit unit is equal to the number of columns of the map table.

6. The parity engine of claim 1, wherein the number of the subunits disposed in the XOR engine is equal to the number of rows of the map table.

7. A parity engine for use in a storage virtualization controller, comprising:
    a control unit;
    a control unit buffer, serving as a data buffer of the control unit and storing a map table required for an operation;
    at least one XOR engine, being started by the control unit, and used to select data from a data stream according to the map table stored in the control unit buffer for performing an XOR operation;
    at least one data buffer, serving as a data buffer of the XOR engine during an operating process; and
    a map table buffer coupled with the control unit and the control unit buffer for storing map tables corresponding to all values in a selected domain of a Galois Field.

8. A parity engine for use in a storage virtualization controller, comprising:
    a control unit;
    a control unit buffer, serving as a data buffer of the control unit and storing a map table required for an operation;
    at least one XOR engine, being started by the control unit, and used to select data from a data stream according to the map table stored in the control unit buffer for performing an XOR operation;
    at least one data buffer, serving as a data buffer of the XOR engine during an operating process; and a register filled in with values and started by a CPU of the storage virtualization controller, so as to trigger and start the control unit.

9. A parity engine for use in a storage virtualization controller, comprising:
a control unit;
a control unit buffer, serving as a data buffer of the control unit and storing a map table required for an operation;
at least one XOR engine, being started by the control unit, and used to select data from a data stream according to the map table stored in the control unit buffer for performing an XOR operation;
at least one data buffer, serving as a data buffer of the XOR engine during an operating process; and
an internal main (IM) bus interface used to connect the parity engine to external components, and the internal main (IM) bus interface is coupled to the control unit, the control unit buffer, the at least one XOR engine and the at least one data buffer of the XOR engine.

10. A storage virtualization controller, comprising:
a CPU;
a CPU interface, being a communication interface between the CPU and other components;
a memory controller, being a communication interface between other components and a memory; and
an internal main (IM) bus, coupled to the CPU interface and the memory controller for transmitting a data signal and a control signal therebetween; and
a parity engine, used to perform a parity function of a specific RAID type to respond to an instruction from the CPU, the parity engine comprising:
a control unit;
a control unit buffer, serving as a data buffer of the control unit and storing a map table required for an operation;
at least one XOR engine, being started by the control unit, and used to select data from a data stream according to the map table to perform an XOR operation;
at least one data buffer, serving as a data buffer of the XOR engine during an operation process; and
an internal main (IM) bus interface serving as an interface for connecting the parity engine to the internal main (IM) bus and coupled to the control unit, the control unit buffer, the XOR engine and the data buffer of the XOR engine inside the parity engine.

11. The controller of claim 10, wherein the internal main (IM) bus has a pipelining capability.

12. A storage virtualization controller, comprising:
a CPU;
a parity engine, used to perform a parity function of a specific RAID type to respond to an instruction from the CPU, the parity engine comprising:
a control unit;
a control unit buffer, serving as a data buffer of the control unit and storing a map table required for an operation;
at least one XOR engine, being started by the control unit, and used to select data from a data stream according to the map table to perform an XOR operation; and
at least one data buffer, serving as a data buffer of the XOR engine during an operation process; and
a register filled in with values and started by the CPU, so as to trigger and start the control unit.

13. A storage virtualization subsystem, comprising:
a storage virtualization controller, connected to a host, for performing an I/O operation to respond to an I/O request issued by the host; and
a physical storage device array, coupled to the storage virtualization controller for providing the host storage space through the storage virtualization controller;
wherein the storage virtualization controller includes a parity engine used to perform a parity function of a specific RAID type to respond to an instruction from a CPU, the parity engine comprising:
a control unit;
a control unit buffer, serving as a data buffer of the control unit and storing a map table required for an operation;
at least one XOR engine, being started by the control unit, and used to select data from a data stream according to the map table to perform an XOR operation; and
at least one data buffer, serving as a data buffer of the XOR engine during an operation process;
wherein the XOR engine includes a subunit having at least one basic circuit unit, and the basic circuit unit comprises:
a plurality of AND gates, each having an input end corresponding to each bit of data in the data stream, and having another input end corresponding to each element of the map table, so as to select data in the data stream according to the map table; and
a plurality of XOR gates, used to perform XOR operations on the outputs of the plurality of AND gates, and outputting operation results to the data buffer of the XOR engine.

14. A storage virtualization computer system, comprising:
a host, used to issue an I/O request;
a storage virtualization controller, coupled to the host for performing an I/O operation to respond to the I/O request issued by the host; and
a physical storage device array, coupled to the storage virtualization controller for providing the host storage space through the storage virtualization controller;
wherein the storage virtualization controller includes a parity engine used to perform a parity function of a specific RAID type to respond to an instruction from a CPU, the parity engine comprising:
a control unit;
a control unit buffer, serving as a data buffer of the control unit and storing a map table required for an operation;
at least one XOR engine, being started by the control unit, and used to select data from a data stream according to the map table to perform an XOR operation;
at least one data buffer, serving as a data buffer of the XOR engine during an operation process; and
a map table buffer coupled with the control unit and the control unit buffer for storing the map tables corresponding to all values in a selected domain of a Galois Field.

15. A method of generating data by a parity engine in a storage virtualization controller, comprising the steps of:
starting at least one XOR engine by a control unit;
selecting data from a data stream and performing an XOR operation according to a map table, and storing an operation result in a data buffer; and
determining by the XOR engine whether calculation on all the data streams has completed; if no, then repeating the step of performing the XOR operation until the calculation for all the data streams is completed, and transmitting an operation result from the data buffer to a memory of the controller.

16. A method of generating data by a parity engine in a storage virtualization controller, comprising the steps of:
generating a plurality of the map tables corresponding to all values in a selected domain of a Galois field and pre-storing them in a memory;
starting at least one XOR engine by a control unit; and
selecting data from a data stream and performing an XOR operation according to one of the plurality of map tables, and storing an operation result in a data buffer.

17. The method of claim 16, further comprising:
sending a memory address of the map table required by the data stream to the parity engine by a CPU; and
reading the map table according to the memory address to a control unit buffer by the control unit;
thereby, the XOR engine can perform selecting the data from the data stream and performing the XOR operation according to the map table.

18. The method of claim 16, further comprising:
sequentially collecting and compiling the map tables required by the data streams and storing the map tables in the memory by a CPU;
filling a value into a register to start the control unit by the CPU, and informing the control unit a start address of the map tables having been arranged in order and required in the operations; and
reading the map tables according to the start address to a control unit buffer by the control unit;
thereby, the XOR engine can perform selecting the data from the data stream and performing the XOR operation according to the map tables.

19. The method of claim 16, wherein the generating step is performed by the CPU when the controller is booted.

20. The method of claim 16, wherein the generating step is performed before the controller leaves a factory so that the map tables corresponding to all the values are stored in advance in the memory.

21. The method of claim 16, wherein the memory is a map table buffer situated in the parity engine.

22. The method of claim 21, further comprising:
creating an index of the map tables corresponding to the data streams, which is to be operated, by a CPU; and
according to the index, sending the corresponding map tables from the map table buffer to a control unit buffer according to the operating sequence of the data streams by the control unit;
thereby, the XOR engine can perform selecting the data from the data stream performing the XOR operation according to the map tables.

23. A method of generating data by a parity engine in a storage virtualization controller, comprising the steps of:
compiling and storing required operation information in a memory by a CPU, where the operation information contains various settings and information required by the parity engine;
starting at least one XOR engine by a control unit; and
selecting data from a data stream and performing an XOR operation according to a map table, and storing an operation result in a data buffer.

24. The method of claim 23, wherein the operation information includes a storage address of the data stream, information for obtaining a memory address of the map table, and a memory address for storing the operation result.

25. The method of claim 23, further comprising the step of filling a start address, storing the operation information, in a register to trigger and start the control unit and transmitting the start address to the control unit, after the step of establishing the operation information by the CPU.

26. The method of claim 25, further comprising a step of reading the operation information to a control unit buffer according to the start address by the control unit.

27. The method of claim 23, wherein the operation information is compiled according to an operating instruction list created based on a previously defined data transfer protocol format.

28. The method of claim 27, wherein the operating instruction list includes a related index field for indicating a memory address of the next operating instruction list.

29. The method of claim 27, wherein the operating instruction list includes an interrupt field for determining whether an interrupt signal is generated or not to inform the CPU after the operation indicated in the operation instruction list is completed.

30. The method of claim 27, wherein the operating instruction list includes a basic XOR element count field for indicating the number of operation units of the data stream.

31. The method of claim 27, wherein the operating instruction list includes a basic XOR element size field for setting the size of an operation unit.

32. The method of claim 27, wherein the operating instruction list includes a start simple XOR operation indication field for indicating the XOR engine to start a simple XOR operation for the data stream.

33. The method of claim 27, wherein the operating instruction list includes an XOR number bit field for indicating the number of the XOR engines being started for computing data.

34. The method of claim 27, wherein the operating instruction list includes:
a plurality of data stream address fields, for indicating the start addresses of a plurality of the data streams;
a number of data stream field, for indicating the number of the data streams in operations; and
a total length of streams field, for indicating a total length of the data streams required to be computed.

35. The method of claim 27, wherein the operating instruction list includes a plurality of generalized XOR descriptors, comprising:
a memory address field of the operation result, for indicating a memory address storing the operation result; and
a memory address field of the map table, for indicating the information to obtain the map table.

36. The method of claim 35, wherein said the number of the generalized XOR descriptors is equal to the number of parities adopt by the controller.

37. The method of claim 35, wherein the memory address field of the map table is filled in with a start address of the map table.

38. The method of claim 35, wherein the memory address field of the map table is filled in with an index of the map table.

39. The method of claim 35, wherein the operating instruction list includes a preload previous results field for indicating whether it is necessary to base on the memory address in the memory address field, used to store the operation result, of the generalized XOR descriptors to load a data stream from a memory to the data buffer to be an initial data of the operation performed by the XOR engine.

40. A method of generating data by a parity engine in a storage virtualization controller, comprising the steps of:
starting at least one XOR engine by a control unit; and
selecting data from a data stream and performing an XOR operation according to a map table, and storing an operation result in a data buffer;

wherein the XOR engine loads a content from the data buffer as an initial data before selecting the data from the data stream and performing the XOR operation.

41. A storage virtualization subsystem, comprising:

a storage virtualization controller, connected to a host, for performing an I/O operation to respond to an I/O request issued by the host;

a physical storage device array, coupled to the storage virtualization controller for providing the host storage space through the storage virtualization controller;

wherein the storage virtualization controller includes a parity engine used to perform a parity function of a specific RAID type to respond to an instruction from a CPU, the parity engine comprising:

a control unit;

a control unit buffer, serving as a data buffer of the control unit and storing a map table required for an operation;

at least one XOR engine, being started by the control unit, and used to select data from a data stream according to the map table to perform an XOR operation;

at least one data buffer, serving as a data buffer of the XOR engine during an operation process; and a map table buffer coupled with the control unit and the control unit buffer for storing the map tables corresponding to all values in a selected domain of a Galois Field.

42. A storage virtualization subsystem, comprising:

a storage virtualization controller, connected to a host, for performing an I/O operation to respond to an I/O request issued by the host;

a physical storage device array, coupled to the storage virtualization controller for providing the host storage space through the storage virtualization controller;

wherein the storage virtualization controller includes a parity engine used to perform a parity function of a specific RAID type to respond to an instruction from a CPU, the parity engine comprising:

a control unit;

a control unit buffer, serving as a data buffer of the control unit and storing a map table required for an operation;

at least one XOR engine, being started by the control unit, and used to select data from a data stream according to the map table to perform an XOR operation;

at least one data buffer, serving as a data buffer of the XOR engine during an operation process; and a register filled in with values and started by the CPU of the storage virtualization controller, so as to trigger and start the control unit.

43. A storage virtualization subsystem, comprising:

a storage virtualization controller, connected to a host, for performing an I/O operation to respond to an I/O request issued by the host;

a physical storage device array, coupled to the storage virtualization controller for providing the host storage space through the storage virtualization controller;

wherein the storage virtualization controller includes a parity engine used to perform a parity function of a specific RAID type to respond to an instruction from a CPU, the parity engine comprising:

a control unit;

a control unit buffer, serving as a data buffer of the control unit and storing a map table required for an operation;

at least one XOR engine, being started by the control unit, and used to select data from a data stream according to the map table to perform an XOR operation;

at least one data buffer, serving as a data buffer of the XOR engine during an operation process; and an internal main (IM) bus interface used to connect the parity engine to external components, and the internal main (IM) bus interface is coupled to the control unit, the control unit buffer, the at least one XOR engine and the at least one data buffer of the XOR engine.

* * * * *